United States Patent
Abdallah et al.

(10) Patent No.: US 12,122,206 B2
(45) Date of Patent: Oct. 22, 2024

(54) AIR SUSPENSION CONTROL

(71) Applicant: RIVIAN IP HOLDINGS, LLC, Irvine, CA (US)

(72) Inventors: Thomas Frederick Abdallah, Huntington Beach, CA (US); Mark George Milne, Peterborough (GB); Jay Dixit, Irvine, CA (US); Derrick Michael Tan, Reseda, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 226 days.

(21) Appl. No.: 17/862,155

(22) Filed: Jul. 11, 2022

(65) Prior Publication Data

US 2023/0040600 A1 Feb. 9, 2023

Related U.S. Application Data

(60) Provisional application No. 63/240,689, filed on Sep. 3, 2021, provisional application No. 63/226,679, filed on Jul. 28, 2021.

(51) Int. Cl.
*B60G 17/016* (2006.01)
*B60G 17/015* (2006.01)

(52) U.S. Cl.
CPC ....... *B60G 17/016* (2013.01); *B60G 17/0155* (2013.01); *B60G 2500/30* (2013.01)

(58) Field of Classification Search
CPC .............. B60G 17/016; B60G 17/0155; B60G 2500/30; B60G 2400/204; B60G 17/019;
(Continued)

(56) References Cited

U.S. PATENT DOCUMENTS 5,014,199 A 5/1991 Konishi et al.
5,083,275 A 1/1992 Kawagoe et al.
(Continued)

FOREIGN PATENT DOCUMENTS

DE 3800541 A1 7/1989
DE 3919040 A1 12/1990
(Continued)

OTHER PUBLICATIONS

Liu, et al., "General Theory of Skyhook Control and Its Application to Semi-Active Suspension Control Strategy Design", IEEE Access 7: 101552-101560 (2019).
(Continued)

*Primary Examiner* — Xiao En Mo
(74) *Attorney, Agent, or Firm* — Haley Guiliano LLP

(57) ABSTRACT

Example illustrations are directed to a suspension system for a vehicle and methods. In some examples, a controller of a suspension system is configured to determine the vehicle is in a service environment, and to set a height precision mode for the suspension system based on the determination the vehicle is in the service environment. In some examples, the controller is configured to detect a suspension operating condition of the vehicle, and to change a setting associated with the suspension system based on the suspension operating condition. An example method comprises detecting, using a controller, a suspension operating condition of a suspension system of a vehicle. The method may further include changing, using the controller, a setting associated with the suspension system based upon the suspension operating condition.

20 Claims, 24 Drawing Sheets

(58) Field of Classification Search
CPC .......... B60G 2400/252; B60G 2400/41; B60G 2400/51222; B60G 2400/842; B60G 2600/08; B60G 2600/20
See application file for complete search history.

(56) References Cited

U.S. PATENT DOCUMENTS

| | | | |
|---|---|---|---|
| 5,430,647 | A | 7/1995 | Raad et al. |
| 5,765,115 | A | 6/1998 | Ivan |
| 11,390,129 | B1 | 7/2022 | Edren |
| 2004/0015279 | A1 | 1/2004 | Barron et al. |
| 2005/0090956 | A1 | 4/2005 | Ogawa |
| 2005/0212225 | A1 | 9/2005 | Suzuki et al. |
| 2006/0186728 | A1 | 8/2006 | Mizuta et al. |
| 2009/0254250 | A1 | 10/2009 | Koo |
| 2010/0025946 | A1* | 2/2010 | Inoue .................... B60G 15/08 280/6.157 |
| 2012/0046827 | A1 | 2/2012 | Larkins et al. |
| 2014/0379210 | A1 | 12/2014 | Hoinkhaus |
| 2017/0100980 | A1 | 4/2017 | Tsuda |
| 2018/0194286 | A1 | 7/2018 | Stein |
| 2019/0359025 | A1 | 11/2019 | Wager |
| 2021/0379954 | A1 | 12/2021 | Bremmer et al. |

FOREIGN PATENT DOCUMENTS

| | | |
|---|---|---|
| DE | 19525835 A1 | 1/1997 |
| DE | 10163552 A1 | 7/2003 |
| DE | 10244363 A1 | 4/2004 |
| DE | 102004052765 A1 | 5/2006 |
| DE | 102010055594 A1 | 8/2011 |
| DE | 102011084669 A1 | 11/2012 |
| DE | 102011100387 A1 | 11/2012 |
| DE | 102011121756 A1 | 6/2013 |
| DE | 102012019619 A1 | 4/2014 |
| DE | 102012017118 A1 | 5/2014 |
| DE | 102014112445 A1 | 3/2016 |
| DE | 102018109578 A1 | 10/2018 |
| DE | 102017117955 A1 | 2/2019 |
| GB | 2373223 A | 9/2002 |

OTHER PUBLICATIONS

Shen, et al., "Stereo Vision Based Road Surface Preview", IEEE 17th International Conference on Intelligent Transportation System (ITSC), p. 1843-1849 (Oct. 8-11, 2014).

Zin, et al., "A feedback-feedforward suspension control strategy for global chassis control through anti-roll distribution" International Journal of Vehicle Autonomous Systems 7(3/4): 22 pages (2009).

* cited by examiner

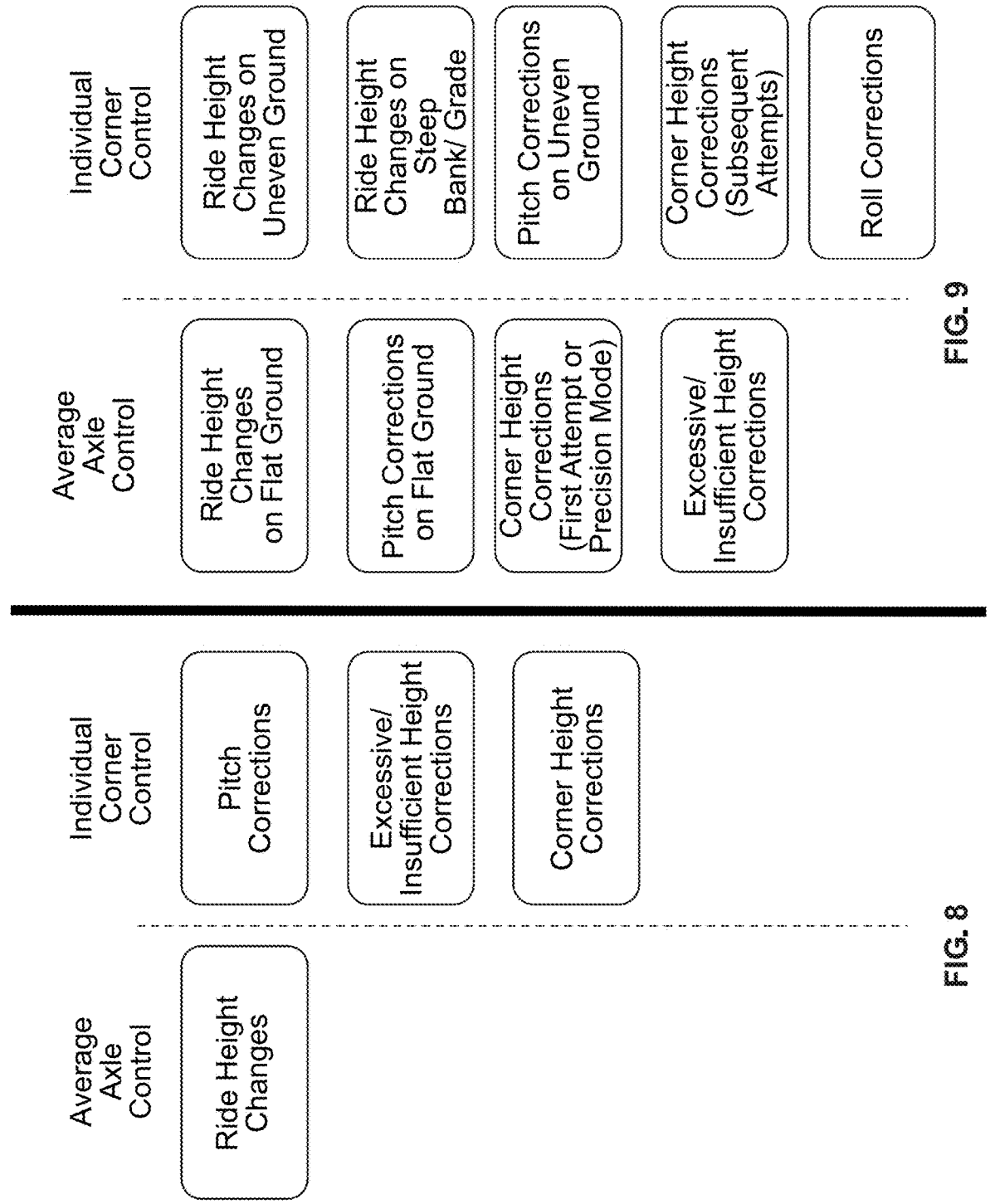

AIR SUSPENSION CONTROL

CROSS-REFERENCE TO RELATED APPLICATION

The present application claims priority to U.S. Provisional Patent Application Ser. No. 63/226,679, filed on Jul. 28, 2021, and U.S. Provisional Patent Application Ser. No. 63/240,689, filed on Sep. 3, 2021, and the contents of each application is hereby expressly incorporated by reference in their entireties.

INTRODUCTION

The present disclosure is directed to a vehicle suspension system, and more particularly to a vehicle suspension system that allows for adjustments to a ride height of a vehicle.

SUMMARY

Some vehicle suspension systems allow manual or automatic adjustments to vehicle height. For example, a user may be allowed to select different ride heights, e.g., to modify vehicle capabilities for off-road use. In another example, a vehicle may have an automatic levelling system that responds to changes in vehicle loading to level the vehicle, e.g., in response to a heavy load being placed in a rear cargo area of the vehicle. Rough road surfaces may cause the vehicle to perform levelling events excessively to the extent the vehicle attempts to respond to rapid changes in wheel position. This can be noticed by vehicle occupants as overactivity and unnecessary actuation by the levelling system. Accordingly, in some example illustrations herein a road roughness metric or estimator dynamically estimates a roughness value, which may be used to widen acceptable control tolerances of the air suspension system when the road is relatively rougher. On these relatively rough surfaces, over-corrections by the levelling system may be reduced or prevented entirely. Additionally, tolerances may be altered in response to a determination that a road surface is relatively smooth, allowing the levelling system to make levelling adjustments as appropriate.

Another problem for vehicles with automatic levelling systems arises when suspension or other components are incorrectly installed or serviced. For example, if an incorrectly installed or serviced vehicle component would cause a vehicle to lean, e.g., toward one side or corner of the vehicle, the automatic levelling of the vehicle in response will necessarily increase the weight applied by the wheels at that side or corner to the ground surface, creating an asymmetry in the wheel weights of the vehicle. The asymmetric corner weights negatively affect vehicle dynamic behavior. Moreover, the level appearance of the vehicle may mask the underlying condition to service or assembly personnel. Accordingly, in some example illustrations uneven corner weights may be addressed by employing a control methodology for levelling vehicle suspension in a manner that facilitates identification of incorrect vehicle suspension installation or setup, while responding appropriately during normal conditions or operation.

In at least some example illustrations, a suspension system for a vehicle includes a controller configured to determine the vehicle is in a service environment. The controller may also be configured to set a height precision mode for the suspension system based on the determination the vehicle is in the service environment.

In at least some example suspension systems, the height precision mode includes at least a plurality of height precision modes having different corresponding control tolerances. Further, the controller may be configured to identify an optimal one of the plurality of height precision modes based on the suspension system operating condition, and to modify the suspension system to be in the determined height precision mode. Additionally, setting the height precision mode to decrease the control tolerance may, in these examples, disable an average axle control leveling of the vehicle.

In at least some examples, the controller is further configured to determine the vehicle is outside of the service environment to set a height axle control mode. Further, the height axle control mode includes at least an average axle control methodology. A height adjustment of the suspension may be based upon an average of two vehicle heights determined at a single axle of the vehicle.

In at least some example suspension systems, the controller is further configured to determine the vehicle is outside of the service environment to set a height axle control mode. Additionally, the height axle control mode further includes an independent axle control methodology, wherein first and second height adjustments are independently implemented at a first wheel of an axle of the vehicle and a second wheel of the axle.

In a subset of these examples, the controller is configured to implement the independent axle control methodology in response to one of detecting a height error or detecting an incomplete height correction.

In at least some examples, a suspension system for a vehicle is provided that includes a controller configured to detect a suspension operating condition of the vehicle. The controller may also be configured to change a setting associated with the suspension system based on the suspension operating condition.

In at least some example suspension systems, the suspension operating condition includes one of a ground surface angle, a vehicle steering angle, a vehicle speed, a suspension correction condition, or an ambient temperature.

In at least some examples, the setting associated with the suspension system includes one of a height change limit, a vehicle speed limit, a height change precision, an axle height adjustment independence level, a height adjustment threshold, or a suspension activity.

In at least some example suspension systems, the suspension operating condition comprises a vehicle ground height. The setting associated with the suspension system may comprise a vehicle speed limit. Additionally, the controller may be configured to implement the vehicle speed limit in response to the vehicle ground height being above a predetermined vehicle height threshold.

In at least some examples, the suspension operating condition comprises vehicle speed, and the setting associated with the suspension system comprises a vehicle height limit. Additionally, the controller may be configured to implement the vehicle height limit in response to the vehicle speed being above a predetermined vehicle speed threshold.

The suspension operating condition may, in at least some examples, be one of an individual wheel articulation above a predetermined relative articulation threshold, an automatic levelling event, a drive mode change, or an operating environment of the vehicle. In these examples, the setting may comprise an axle height control methodology.

In at least some examples, the axle height control methodology includes at least an average axle control methodology. Additionally, a height adjustment of the suspension may be based upon an average of two vehicle heights determined at a single axle of the vehicle. In at least a subset of these examples, the axle height control methodology further includes an independent axle control methodology, in which the first and second height adjustments are independently implemented at a first wheel of an axle of the vehicle and a second wheel of the axle.

In at least some example suspension systems, the controller is configured to implement the independent axle control methodology in response to one of (a) detecting the operating environment of the vehicle is a service environment, (b) detecting a height error, or (c) detecting an incomplete height correction.

In at least some examples, the controller is configured to implement height changes at two different axles within an axle height difference limit, such that a first height change is initiated at a first one of the two axles until the axle height difference limit is reached, and a second height change is initiated at a second one of the two axles until one of the height difference limit or an overall height change is reached. The second height change may, in these examples, be initiated until the height different limit is reached, wherein the controller implements a third height change at the first one of the two axles.

In at least some example suspension systems, the suspension operating condition includes an ambient temperature of the vehicle. Additionally, the controller may be configured to reduce a suspension activity in response to a first temperature detected above a predetermined threshold.

The controller may, in at least some examples, be configured to change a suspension activity between a plurality of discrete suspension activity categories. Each of the discrete suspension activity categories, in these examples, include one or more suspension operating parameter adjustments.

In at least some example suspension systems, the controller is configured to equalize an air pressure of a plurality of air springs of a single axle after implementing a height change at the single axle, with the plurality of air springs being associated with opposite wheels of the single axle.

In at least some examples, the controller is configured to change one or more heights of the vehicle by changing an air pressure of one or more air springs of the vehicle.

In at least some example illustrations, a method is provided comprising detecting, using a controller, a suspension operating condition of a suspension system of a vehicle. The method may further include changing, using the controller, a setting associated with the suspension system based upon the suspension operating condition.

BRIEF DESCRIPTION OF THE FIGURES

FIG. 8 shows a correction strategy for suspension levelling corrections of a vehicle, in accordance with an example approach;

FIG. 9 shows an example correction strategy for suspension levelling corrections of a vehicle, in accordance with an example;

DETAILED DESCRIPTION

Figure 1:
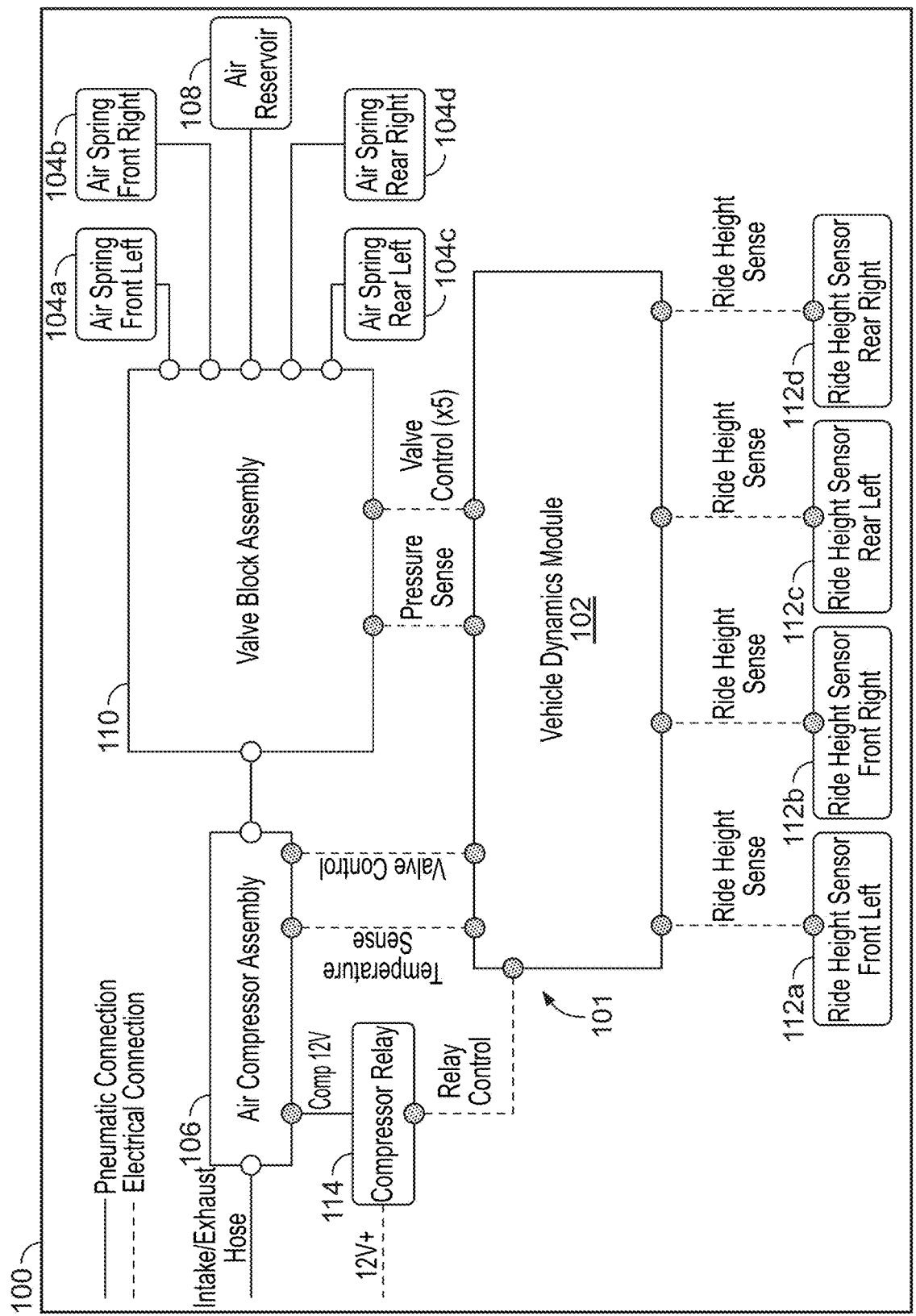
FIG. 1 shows a schematic illustration of a vehicle having a suspension system that allows for adjustments to a vehicle ride height by way of adjustable air springs, in accordance with an example approach.

As will be described further below, in at least some example approaches a roughness of a road, surface, trail, etc. may be approximated based upon vertical displacement of the wheels away from an expected or neutral position over time, or as the vehicle traverses the road, surface, trail, etc. When driving on a very smooth surface, e.g., a paved road, vehicle wheels may tend to experience minimal vertical movement. On rough surfaces, e.g., a gravel road, trail, or any off-road environment, however, surface/road inputs will drive greater vertical displacement of the wheels away from their neutral position. It will be understood that reference to a "road" roughness or surface does not encompass only paved road surfaces, but also unpaved roads, gravel, dirt, or any off-road environment.

Example roughness metrics may be determined using a function or algorithm that generally attempts to quantify how much road input the wheels experience over a distance, as a proxy for the roughness of the surface. The quantified roughness may be used to influence operation of the suspension, e.g., by setting or altering control tolerances in response to changes in roughness. Example vehicles, suspension systems, and methods may thus be directed to determining a roughness metric of a surface being traversed by the vehicle based on ride height measurements and setting a height adjustment parameter, e.g., a tolerance, for the air suspension system based on the roughness metric. As will be discussed further below, in some example approaches an estimate of surface "flatness" may be used in conjunction with estimates of roughness to facilitate changes to suspension adjustment parameters that are appropriate for surface conditions. For example, estimates of roughness and flatness may be used to desensitize a vehicle suspension system such that fewer and/or less significant ride height changes are made when surfaces being traversed by a vehicle are relatively rough or non-flat. The vehicle and/or suspension system may have a controller or module configured to facilitate a modification of the suspension system based on the determined height adjustment parameter. For example, height adjustments may be facilitated by altering a tolerance associated with controlling one or more heights or displacements of a spring, e.g., an air spring of the vehicle. In some example approaches, a gain of a controller may be changed to adjust a tolerance, e.g., to raise a tolerance when a rough surface is detected, and/or a surface is inducing twist in the vehicle suspension. As will be discussed further below, the vehicle may accordingly reduce or prohibit ride height changes, or change methodology for ride height changes, during conditions when corrective action may be difficult or likely to result in errors, e.g., when vehicle wheels are rapidly being moved over time by a relatively rough surface, or when relatively large amounts of suspension twist are induced by non-flat surface.

In other example approaches, a vehicle suspension system may employ different control methodologies in an effort to allow visual diagnosis of incorrect installation or service of the vehicle. For example, as will be described further below, when a vehicle is in a service or manufacture setting, the vehicle may employ a relatively more precise control methodology using independent control of the height at each corner/wheel/air spring of the vehicle. When the vehicle is not in such service/assembly conditions, a relatively lower precision control methodology may be used.

As also discussed further below, in some example approaches a vehicle, controller thereof, or method may be directed to detecting a suspension operating condition of the vehicle or operating environment, and changing a setting associated with the suspension system based on the suspension operating condition/environment. The suspension operating conditions may include, merely as examples, a ground surface angle, a vehicle steering angle, a vehicle speed, a suspension correction condition, or an ambient temperature, as will be discussed further below. Settings associated with the suspension system may include, for example, a height change limit, a vehicle speed limit, a height change precision or tolerance, an axle height adjustment independence level, a height adjustment threshold, or a suspension activity.

Figure 2:
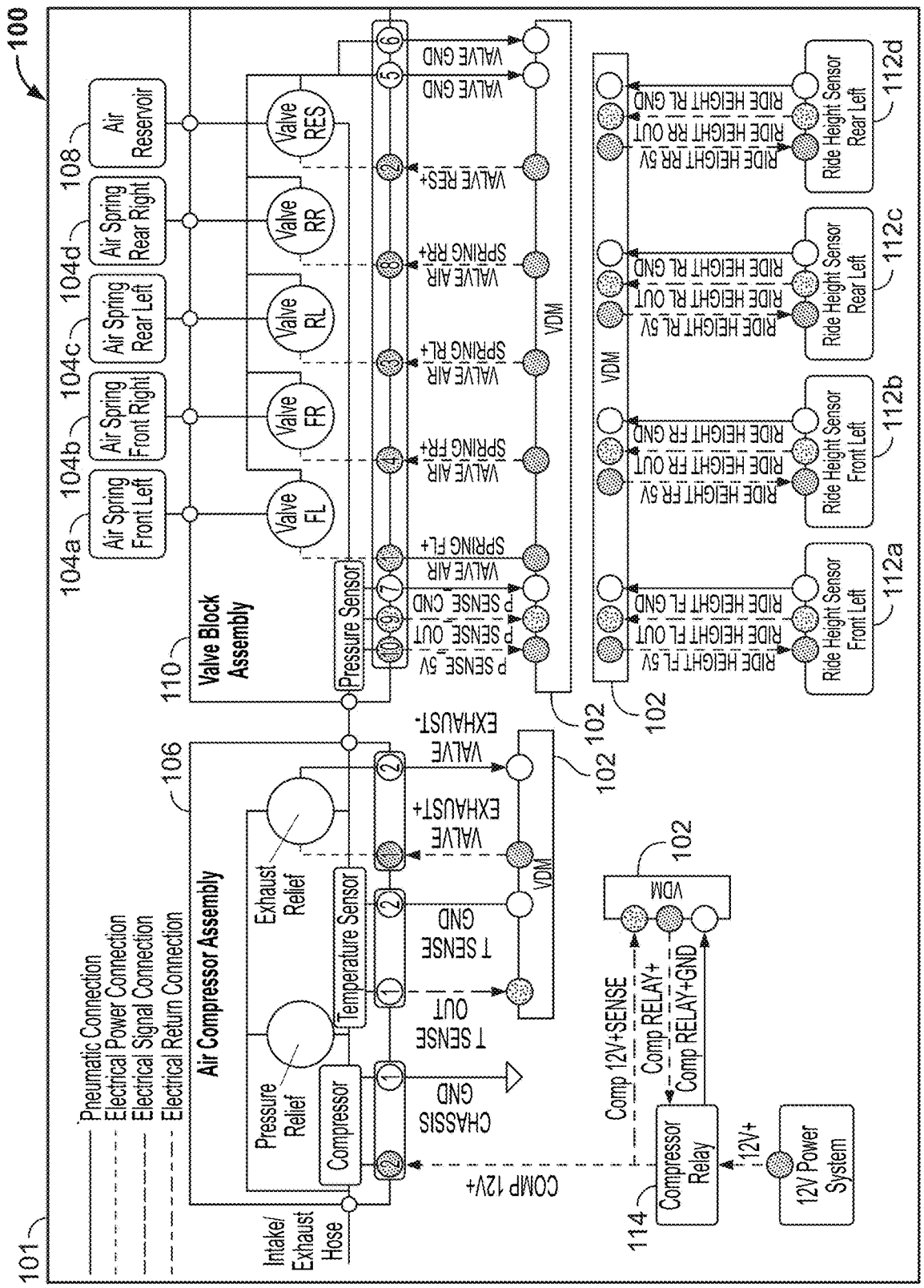
FIG. 2 shows a schematic illustration of the vehicle of FIG. 1 illustrating example pneumatic and electrical connections of the suspension system, according to an example.

Turning now to FIGS. 1 and 2, an example vehicle 100 having a suspension system 101 that allows for controlling vehicle ride height is illustrated and described in further detail, as may be used in connection with various example illustrations herein. The vehicle 100 may be a battery electric vehicle, e.g., with one or more motor-generators driven by electrical power supplied by a battery pack (not shown). In FIG. 1, pneumatic and electrical connections between components of the vehicle 100 discussed below are illustrated, in accordance with an example approach. In FIG. 2, vehicle 100 and suspension system 101 are illustrated with the same pneumatic connections illustrated in FIG. 1, and more specific electrical connections, e.g., electrical power, electrical signal, and electrical return connections are also illustrated. The vehicle 100 includes a vehicle dynamics module 102 configured to control vehicle ride height, e.g., by way of one or more processors. The vehicle dynamics module 102 may generally control one or more air springs 104a, 104b, 104c, 104d (collectively, 104). Generally, each of the air springs 104 may store pneumatic energy in a chamber between a corresponding wheel of the vehicle 100, and a body (not shown) of the vehicle 100. As noted in FIG. 1, the air springs 104 are each at a designated corner of the vehicle 100, e.g., to function as a compliant element in the suspension of the vehicle 100. In addition to the compliance of the air springs 104, a shock or damper (not shown) may be provided at each vehicle wheel to absorb mechanical energy imparted to the wheel by bumps or undulations in a surface traversed by the vehicle 100. Moreover, the air springs 104 may be configured to raise or lower a ride height of the vehicle 100. More specifically, each of the air springs 104a, 104b, 104c, and 104d may raise or lower respective corner heights of the vehicle 100. As will be seen in further detail below, the vehicle dynamics module 102 may implement changes in ride heights by way of the air springs 104, with each raising its associated corner height of vehicle 100. The vehicle dynamics module 102 may, in some cases, automatically shift between different ride heights in response to vehicle conditions. In other cases, a user, e.g., driver of vehicle 100, may manually select different ride heights by way of a graphical user interface in communication with the vehicle dynamics module 102. The vehicle 100 may include one or more controllers, such as the vehicle dynamics module 102. The vehicle dynamics module 102 and other controllers disclosed herein may comprise a processor and/or a memory. Example processors may be a hardware processor, a software processor (e.g., a processor emulated using a virtual machine), or any combination thereof. In some embodiments, a processor and memory in combination may be referred to as a control circuitry of vehicle 100. In some embodiments, a processor alone may be referred to as control circuitry of vehicle 100. A memory may comprise hardware elements for non-transitory storage of commands or instructions, that, when executed by a processor, cause the processor to operate the vehicle 100 in accordance with embodiments described above and below. For example, a memory may comprise a computer-readable or machine-readable medium. Control circuitry may be communicatively connected to components of vehicle 100 via one or more wires, or via wireless connection.

The vehicle dynamics module 102 may be in electrical communication with an air compressor assembly 106, which generally controls system air pressure. More specifically, a storage volume of air may be contained within an air reservoir or tank 108. The air reservoir 108 may store air under pressure, thereby maintaining a reserve of pneumatic energy that may assist the compressor 106 in raising ride height of the vehicle 100. A valve block assembly 110 actuated by the vehicle dynamics module 102 may be positioned between the compressor 106 and air springs 104 and may be configured to facilitate flow of air between components of the suspension of the vehicle 100. For example, the valve block 110 may control supply of air and/or pneumatic energy from the air reservoir 108 to the air springs 104. The valve block assembly 110 may also facilitate release of air pressure from the air springs 104. Each of the air springs 104 may be independently controlled, e.g., by way of the valve block 110. For example, the valve block 110 may have a plurality of valves 111 (see FIG. 2) corresponding to each of the air springs 104 and the tank 108. The compressor 106 may be controlled by the vehicle dynamics module 102, e.g., by way of a compressor relay 114, and via temperature sense and valve control inputs to the air compressor assembly 106. As will be detailed further below, corner heights or displacements of air springs 104 may be controlled on the basis of any control parameters that are convenient. In one example approach, control of the air springs 104 may be implemented using a displacement control, in which air may be added to/removed from air springs 104 on the basis of a target displacement of the air spring 104 and/or corresponding corner height of the vehicle 100. For example, where a desired displacement of the air spring 104 is desired, an actual/measured displacement or corresponding corner height of vehicle 100 is measured and compared with a target displacement/height, with air being added to/removed from the air spring 104 accordingly. In another example approach, the air springs 104 may be controlled using air mass control, in which air may be added to/removed from air springs 104 on the basis of a target amount or mass of air. For example, where a desired displacement of the air spring 104 is desired, a corresponding mass of air that corresponds to the desired displacement and/or corner height of the vehicle 100 is determined, with air being added to/removed from the air spring 104 to reach the target air mass of the air spring 104. In still another example, a displacement control and air mass control may each be selectively employed depending on conditions of a surface and/or the vehicle 100, as will be discussed further below.

The vehicle 100 may also include ride height sensors 112a, 112b, 112c, and 112d (collectively, 112), each configured to measure a vertical displacement between the corresponding wheel and the vehicle 100. A suspension system of the vehicle 100 may generally automatically level the vehicle 100 and make changes to a ride height of the vehicle 100 by way of adjustments made to the air springs 104, e.g., in response to one or more heights measured by the ride height sensors 112. Accordingly, when the vehicle 100 is carrying a relatively heavy load in a rear cargo area, the rear ride height sensors 112c, 112d may detect that the vehicle height has been reduced. The vehicle 100 may, in response, increase an internal air pressure in the rear air springs 104c, 104d to level the vehicle 100.

In example illustrations herein, as will be elaborated further below, the vehicle 100 may alter a height adjustment parameter (e.g., a tolerance setting of the automatic levelling system or another suspension parameter, or a change to a ride height) in response to a detection, e.g., by the vehicle 100, that a relatively rougher surface is being traversed. For example, the vehicle dynamics module 102 or other controller of vehicle 100 may be configured to increase a height adjustment tolerance in response to an increase in the roughness metric of the road surface. Additionally, the vehicle 100 may decrease a height adjustment tolerance in response to a detected decrease in the roughness metric of the road surface. As will be described further below, in some example approaches a surface or roughness metric is based on a change in corner height error. As used herein, a corner height error is defined as a difference between expected ride height and the actual/measured ride height, which may be determined by the sensors 112. Further, in some examples the roughness metric employs a moving average of the corner height error over a given time window or period. While examples herein are generally directed to altering tolerances for automatic levelling of a suspension system of the vehicle 100, any other suspension parameters may be adjusted in response to detected changes in roughness that are convenient. Accordingly, to any extent a suspension parameter is capable of adjustment by the vehicle 100 and may be affected by variations in roughness of a surface being traversed by vehicle 100, the vehicle 100 may adjust that parameter in response to detected variations in roughness. Merely by way of example, suspension damping settings such as damper compliance/stiffness may be adjusted in response to variations in roughness, e.g., to increase compliance in response to an increase in roughness, and/or decrease compliance in response to a decrease in roughness.

Figure 3:
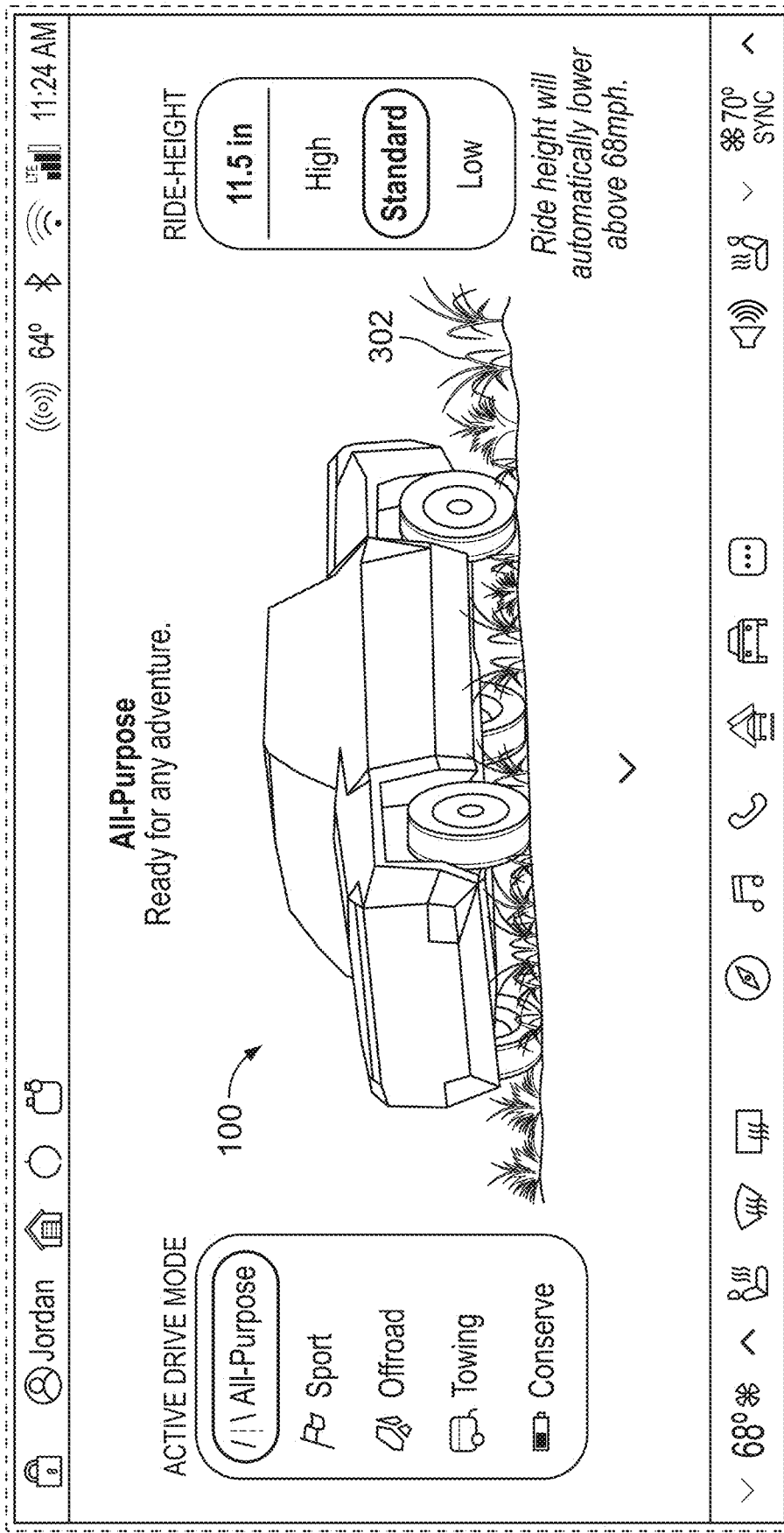
FIG. 3 shows a user interface for interacting with the suspension system of FIGS. 1 and 2, in accordance with an example.
Figure 4:
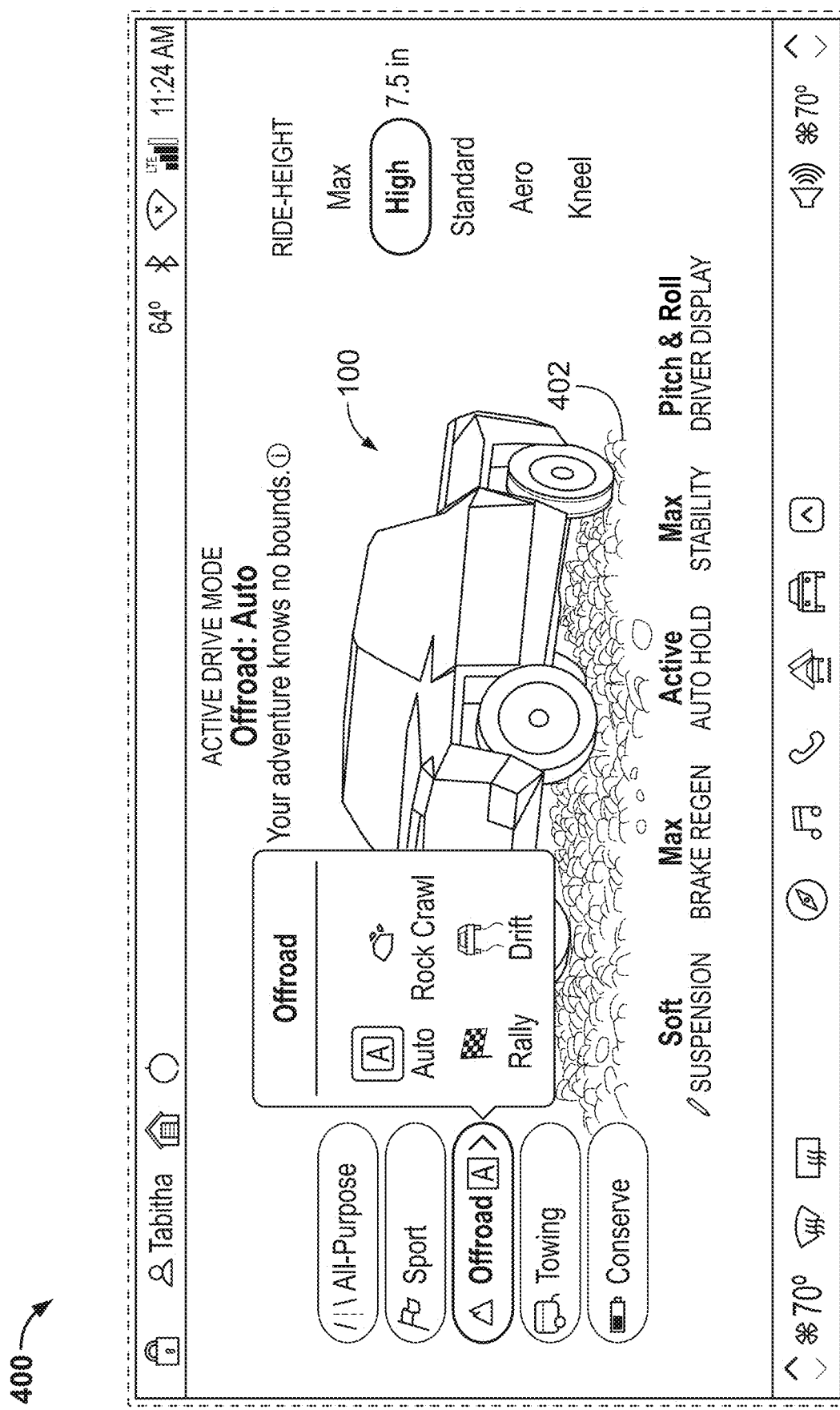
FIG. 4 shows a user interface for interacting with the suspension system of FIGS. 1 and 2, in accordance with an example.

A user may select various ride, suspension, or vehicle modes that may influence performance of air suspension components. For example, as illustrated in FIGS. 3 and 4, one or more user interfaces may be provided for generally selecting a drive mode. The user interface 300 of FIG. 3 and the user interface 400 of FIG. 4 may each be screens or menus provided to a driver or other vehicle occupant, e.g., by way of a touch screen. As shown in FIG. 3, vehicle 100 is represented with a ride height with respect to a ground surface 302. Similarly, the vehicle 100 is represented in FIG. 4 with a ride height with respect to another ground surface 402. The user interfaces 300, 400 may be in communication with vehicle dynamics module 102 to effect changes to the vehicle 100 or components of the suspension of the vehicle 100. Merely by way of example, the various drive modes may affect the air suspension ride height, e.g., by raising or lowering the vehicle 100, by altering compliance of the air springs 104 or dampers/shocks of the vehicle 100, etc. As illustrated in FIG. 3, the vehicle 100 includes an all-purpose mode, a sport mode, an off-road mode, a towing mode, and a conserve (electrical power) mode, each of which are displayed for selection in the user interface 300. Upon selection of one of the modes in user interface 300, a variety of sub-modes may be displayed. For example, upon selection of the off-road mode in user interface 300, as illustrated in FIG. 4 an automatic sub-mode, a rock crawl sub-mode, a rally sub-mode, and a drift sub-mode may be displayed for selection in user interface 400. One or more suspension or vehicle parameters may be displayed in connection with the modes and sub-modes included in the user interfaces 300, 400. Merely as one example, different ride heights may be implemented in the vehicle modes and sub-modes, as will be discussed further below. Additionally, as will also be described further below, a plurality of ride heights may be available within each of the modes and/or sub-modes which, as will be described further below, may be tailored to desired performance traits of vehicle 100 for each of the given modes or sub-modes.

Figure 5:
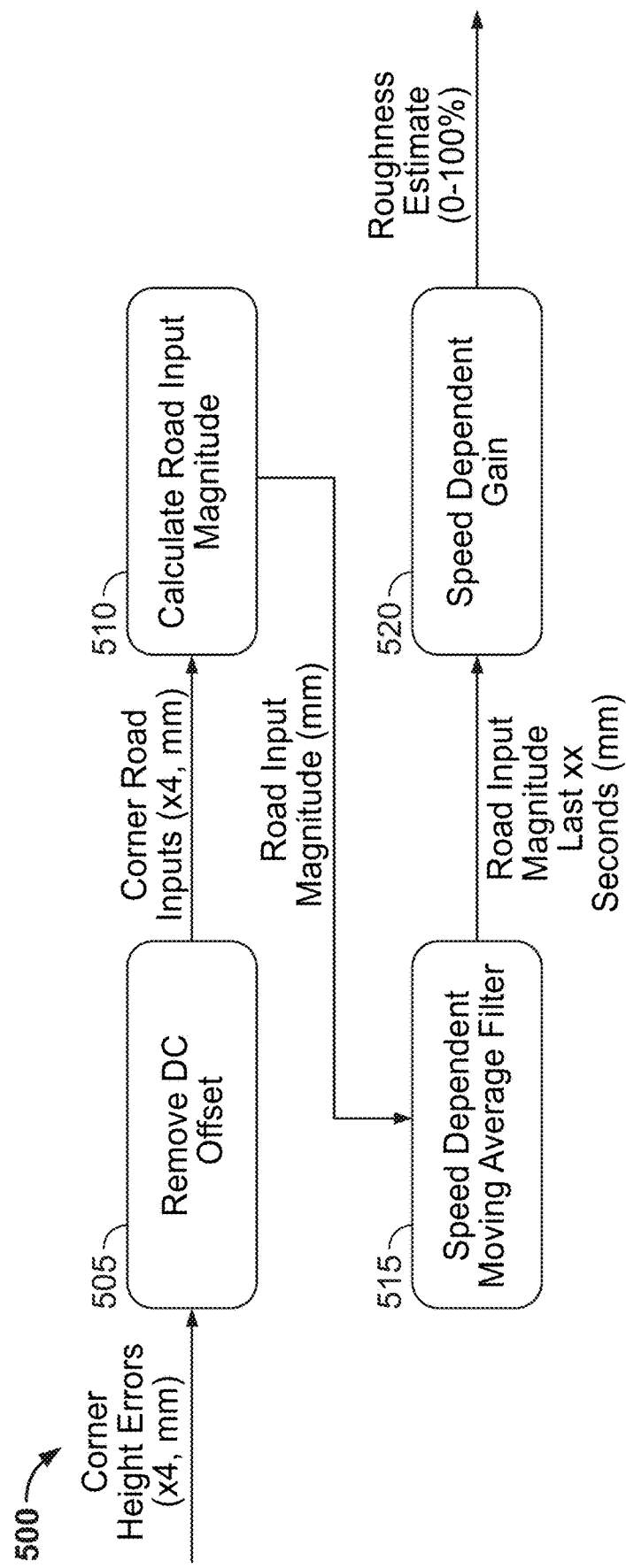
FIG. 5 shows a process flow diagram for a method of facilitating modifications of a suspension system of a vehicle, including estimating a roughness of a surface being traversed by the vehicle, according to an example.

Turning now to FIG. 5, an example process 500 for determining a roughness metric is illustrated and described in further detail. The process 500 may generally be employed when the vehicle is moving, and as such process 500, e.g., using the vehicle dynamics module 102, may confirm or query the vehicle 100 is in motion before employing process 500 to determine a roughness metric. It should be noted that, alternatively, a previously determined roughness may be stored in a non-volatile memory of the vehicle, which may be used as the initial value of the estimator if it has not had any chance to calculate before the suspension is required to operate. This may be useful, e.g., for situations in which the vehicle is parked upon a rough surface, so that roughness is considered upon subsequent use of the vehicle, avoiding the vehicle suspension seeming overactive due to the rough surface. As an input to process 500, corner height error(s) of one or more wheels of the vehicle 100 may be determined. In the example process 500, measurements are made based upon signals received from the four sensors 112, each of which are positioned at a respective wheel of the vehicle 100. Other numbers of sensors and wheels are possible in other example approaches. Generally, corner height error(s) may be determined based upon a difference between an expected or target height and an actual height, e.g., as measured by ride height sensor(s) 112. Expected or target height may be determined in any manner that is convenient. Merely by way of example, the target may be a desired ride height, e.g., 11.5" for an off-road mode of the vehicle 100, or a target corner height of one or more air springs 104. A target height of a particular corner or location of the vehicle, e.g., where an air spring 104 is positioned, may vary dynamically as the vehicle moves. As such, a target height may be adjusted to account for factors such as acceleration, deceleration, cornering, pitch, roll, and the like. In an example, the sensors 112 are displacement sensors that measure a displacement of the wheel from the vehicle 100, although in other examples a wheel accelerometer or the like may be used.

At block 505 of process 500, the vehicle dynamics module 102 may convert the corner height error to a delta or change in the corner height error measurement over a given time period. Initially, it should be understood that the vehicle dynamics module 102 may generally always have some non-zero amount of height error which causes a DC-offset. As described in further detail below, DC-offset generally refers to a physical offset error in measurement, and can result from multiple sources, e.g., a bent sensor arm, an asymmetrically loaded vehicle, etc. To prevent this DC-offset from being counted as road/surface input, process 500 may remove the DC-offset from the corner height error measurements. Further, at block 505 it may also be desired to remove the effects of pitch or roll of the vehicle or other generally constant inputs to the suspension that are not caused by roughness. For example, where vehicle 100 is leaning to the passenger side while traversing a left turn, corner height errors may be present as a result of the lean of the vehicle, but this effect is not caused by roughness. By comparison, where the vehicle 100 is traversing a rough surface, corner height errors at the wheel(s) of the vehicle 100 may be rapidly changing as the wheel is jostled up and down. Accordingly, process 500 may convert the input corner height error to a delta or change in the corner height errors over time. In doing so, the vehicle dynamics module 102 may generally remove more static effects caused by non-road roughness effects. Accordingly, a result of block 505 may be a "corner surface input" at each air spring 104 and/or wheel.

Proceeding to block 510, process 500 may determine a road or surface input magnitude, e.g., by summing the absolute value of the corner surface inputs determined at block 505. Accordingly, process 500 is agnostic regarding whether the surface/road inputs are positive or negative (i.e., whether the rough surface is driving the wheels up/down), and the surface input is simplified by determining the absolute value of the changes in the individual corner height errors, and adding them together. Process 500 may then proceed to block 515.

At block 515, a speed dependent moving average filter may be applied to the input surface input magnitude. Generally, instantaneous measurement of surface input magnitude may be a very noisy signal. Roughness of a road surface, for example, may be obtained by applying a speed-dependent moving average filter in an effort to normalize measurements for a length of road. For example, a filter time constant may be scaled with vehicle speed to achieve different behaviors at low speeds versus high speeds. For example, at relatively lower speeds a smaller time constant may be used, as it is desirable at low speeds for the roughness estimate to emphasize terrain that vehicle 100 has immediately traversed. In other words, it may be desirable to interpret single events such as a curb impact or rock crawl as a relatively rough surface and reduce the extent to which levelling events might occur. This smaller time constant may be useful for rock crawling or parking on top of a curb in a busy parking lot, merely by way of example. By contrast, a relatively larger time constant may be used at higher speeds, as the roughness estimate may tend to be less noisy but more closely reflective of the general roughness of the road surface (as opposed to discrete low-speed events or inputs, e.g., that may be typical of rock crawling). The relatively greater time constant may be useful in reducing the effect of a single input at relatively higher speed, which may be less meaningful when the surface is otherwise relatively smooth, and as a result it may be more desirable for levelling events to proceed at such higher speeds. Any filter device or filtering methodology may be employed. In an example, a 1st-order low-pass infinite impulse response (IIR) filter may be employed, thereby outputting an exponentially weighted moving average filter. After block 515, process 500 may have a surface input magnitude over a previous time window.

Proceeding to block 520, process 500 may apply a speed dependent gain determination to determine a final estimate of roughness, e.g., as a percentage. A gain of this determination may be speed-dependent, with a similar rationale as the filter time constant of block 515. Accordingly, at a lower speed a relatively larger gain may be employed, while a smaller gain may be employed at a higher speed. In this manner, individual wheel displacements for lower speed events, e.g., like driving up on a curb, are treated as a very rough road. In a further example, a 40 millimeter (mm) displacement on one wheel may be observed at a vehicle speed of 20 kilometers/hour, which is treated as a very rough road from the perspective of the ride height controller, i.e., vehicle dynamics module 102. By comparison, at higher speeds a relatively smaller gain may be applied, as it may be desirable for the roughness metric to capture larger wheel displacement events but ignore smaller events that are frequently seen while driving at high speeds even on relatively smooth surfaces. Process 500 may terminate, upon determination of the roughness metric.

In some example illustrations, the vehicle 100 may be configured to select various modes in response to detected conditions. In some examples, vehicle 100 selects a height precision mode that facilitates changing (a) a control tolerance associated with ride height changes and/or (b) a height axle control mode associated with a methodology used to control ride height changes. For example, a height precision mode may be changed to increase or decrease a precision with which ride height changes are made. A height precision mode may be selected from a plurality of height modes. Example height modes may include height precision modes, e.g., a nominal precision mode as well as a service precision mode, in which changes to ride height are made with a greater precision and/or smaller control tolerance than the nominal precision mode. Alternatively or in addition, height modes may include a plurality of height axle control modes may be employed by the vehicle 100 in response to detected conditions. In examples herein, height axle control modes may include an average axle control methodology, in which a height adjustment of the suspension is based upon an average of two vehicle heights determined at a single axle of the vehicle. Alternatively, in other situations the vehicle 100 may employ an independent axle control methodology, in which first and second height adjustments are independently implemented at a first wheel of an axle of the vehicle and a second wheel of the axle. The axle control modes may be selected by the vehicle 100 in response to detection of a service/manufacturing environment or other detected conditions, as will be discussed further below.

Example roughness metrics such as described above and illustrated in FIG. 5 generally do not change in value when a vehicle is stationary. If a vehicle stops and is turned off relatively quickly after pulling into a driveway, the progression of the vehicle over a curb into the driveway and almost-immediate stop following thereafter may cause the vehicle to believe it is parked on a "rough" surface when restarted. To correct for this potential problem and facilitate appropriate changes to suspension height adjustment parameters, it may be useful to consider a "flatness" of a surface being traversed by a vehicle.

As used herein, "flatness" is refers as a lack of twist between different axles of a vehicle (e.g., between front and rear axles of a vehicle). Accordingly, a surface upon which a vehicle rests may be considered perfectly "flat" if left/right displacements of front and rear axles are identical, i.e., the vehicle is "leaning" in the same direction by the same amounts at both front and rear axles (or when there is zero lean at both axles). By comparison, a surface having undulation(s) between front and rear axles causing the front vehicle suspension to "lean" toward one side and the rear vehicle suspension to lean toward the opposite side is inducing "twist" in the vehicle, and the surface is relatively less "flat" relative to the vehicle. Accordingly, in some example approaches a suspension system, vehicle, or associated method may determine an amount of twist of the suspension system, and determine a height adjustment parameter based on the twist. In at least some examples, twist may be used in combination with other metrics, e.g., roughness, in determining a height adjustment parameter. Example illustrations for determining twist may include, as described further below, determining a difference between a first lateral displacement difference of a front axle of the vehicle and a second lateral displacement difference of a rear axle of the vehicle.

If a vehicle is on a surface causing twist in the suspension between the front and rear axles/wheels, difficulties for the vehicle suspension height adjustments may result, particularly if the average axle control methodology mentioned above is being employed. More specifically, if changes in height are being controlled on the basis of an average displacement of both air springs 104 at opposite sides of a single axle while the vehicle is leaning in opposite directions at the front/rear axles, one side of the vehicle will tend to overshoot a ride height target while the opposite side of the vehicle will tend to undershoot the ride height target. Accordingly, in some examples an independent control methodology (i.e., each of the four wheels/air springs being controlled independently) may be employed in response to a determination that the vehicle is on a relatively non-flat surface or the vehicle suspension is undergoing at least a threshold amount of twist. Additionally, height changes may be restricted when the vehicle is on surfaces inducing a threshold amount of twist in the vehicle suspension. It should be noted that measurements of flatness generally do not depend on dynamic movements of the vehicle and/or suspension, and as such do not lose relevance when a vehicle is stationary. By comparison, metrics of roughness may be less relevant when the vehicle is stationary as they are determined based upon movements of the suspension/vehicle over time or as the vehicle traverses a surface. As such, flatness measurements may provide useful information for a vehicle suspension system in determining whether/when to reduce height change corrections, particularly at very low speeds or when the vehicle is stationary.

In an example, twist may be defined as a lack of flatness, and may be quantified by a difference between lateral or side-to-side displacement differences of two axles of a vehicle. Twist in a suspension may be based upon a difference between (1) a first lateral displacement difference of a front axle of the vehicle and (2) a second lateral displacement difference of a rear axle of the vehicle. In one example, this is calculated by:

$$(\text{FL Displacement} - \text{FR Displacement}) - (\text{RL Displacement} - \text{RR Displacement}) = \text{twist}$$

where:
- FL Displacement=displacement of the front-left air spring;
- FR Displacement=displacement of the front-right air spring;
- RL Displacement=displacement of the rear-left air spring; and
- RR Displacement=displacement of the front-left air spring.

In other words, a difference in displacement between the front-left and front-right air spring may be compared with a difference in displacement between the rear-left and rear-right air spring to determine twist. Where both front and rear axles of the vehicle are leaning or rolled in the same direction/amount (or are both level), twist will generally be zero and the underlying surface may be thought of as being "flat." The above calculation provides a measure of vehicle twist or diagonal loading. In an example, filtered signals for each of the displacement measurements may be employed.

As will be described further below, the above measurement of flatness or twist may be used in the context of vehicle 100 in at least several ways described herein. First, height change requests may be rejected if the surface is inducing certain amount of twist in the vehicle (or, put another way, if the surface is non-flat to a certain degree). Additionally, vehicle 100 may use independent axle control methodologies (instead of average control) in response to a determined flatness metric. More specifically, if a surface is uneven, average axle control can lead to asymmetry of the vehicle upon driving away, as noted above. Further, vehicle 100 may determine a de-sensitization factor to be applied to avoid or reduce the effect of ride height changes or levelling events in response to a determined flatness metric.

In at least some example illustrations, vehicle 100 may determine surface conditions based upon a flatness of the surface and a roughness metric, with height adjustment parameters being determined or adjusted in view of one or both of these factors. As noted above, flatness or twist may be determined based upon static displacement measurements of the air springs 104, and as a result may provide useful information while the vehicle 100 is stopped or at very low speeds. By comparison, roughness metrics as described above are determined based upon movements of air springs 104 and/or other components of the vehicle 100 over time. Accordingly, in some example approaches, flatness and roughness are emphasized or de-emphasized based upon a speed of the vehicle 100. For example, roughness metrics may be relied upon to a greater degree (or exclusive of any consideration of flatness/twist) while vehicle 100 is moving, with flatness/twist being relied upon to a greater degree (or exclusive of any consideration of roughness) when the vehicle 100 is stationary or at very low speeds, e.g., below 5 miles per hour (mph). Accordingly, in some example approaches a height adjustment parameter may initially be determined based on roughness, e.g., when the vehicle is in motion, with a subsequent height adjustment parameter being determined based on twist, e.g., when vehicle speed drops to zero or below a speed threshold. Further, context switching may be used to determine de-sensitisation factors to use with respect to a suspension height adjustment parameter. For example, if heights are known to be accurate when a speed of vehicle 100 is above zero, de-sensitizations (e.g., to reduce interventions for height change corrections) may be applied when the vehicle is stopped/static. On the other hand, if height measurements are known to be less accurate while the vehicle 100 is moving (i.e., vehicle speed is above zero), de-sensitization may be applied based (only) on the determined flatness/twist.

Figure 6:
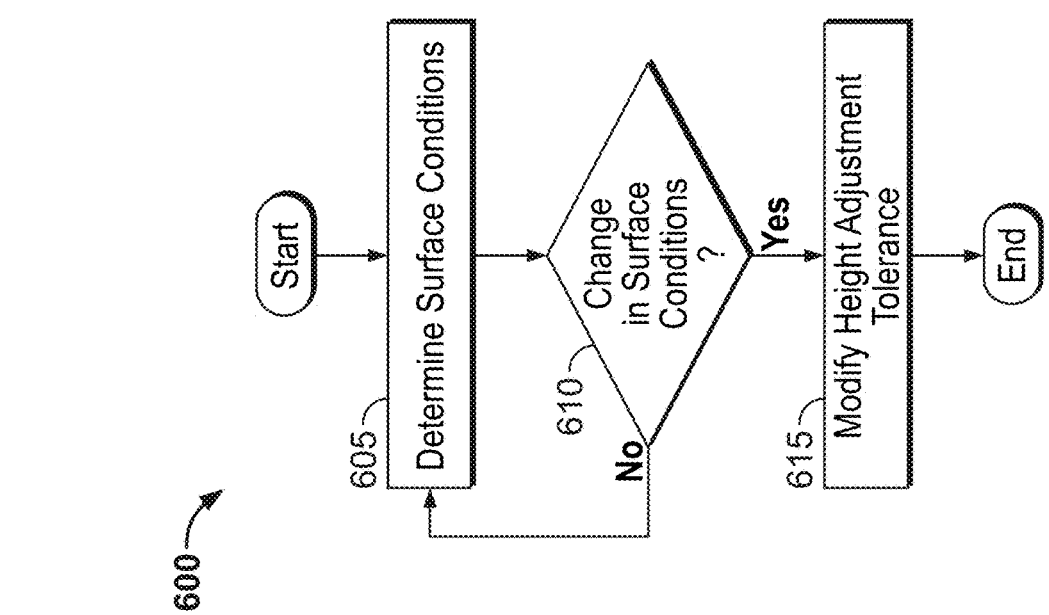
FIG. 6 shows a process flow diagram for a method of facilitating modifications of a suspension system of a vehicle, including modifying a height adjustment tolerance of the vehicle, according to an example.

Referring now to FIG. 6, an example process 600 for determining a height adjustment parameter, e.g., to adjust a tolerance of a vehicle suspension for vehicle 100, is illustrated and described in further detail. The height adjustment parameter may be used to facilitate modification(s) of the suspension. Process 600 may begin at block 605, where surface conditions may be determined. Surface conditions may include roughness (e.g., as set forth above by a roughness metric) and/or flatness characteristics (e.g., as set forth above by suspension twist). For example, upon detection that the vehicle 100 is in motion or turned on a controller, e.g., vehicle dynamics module 102, may determine a roughness metric of a surface being traversed by the vehicle 100 based on ride height measurements, and/or a measurement of suspension twist. In an example, block 605 employs process 500 to determine the roughness metric, and measurements of suspension twist set forth above. Process 600 may then proceed to block 610.

At block 610, process 600 queries whether a change in the surface conditions has taken place, e.g., based on the roughness metric and/or suspension twist determined at block 605. In some examples, the query at block 610 obtains a positive result only when at least one of the roughness metric or twist changes at least by a threshold amount or percentage. Accordingly, the vehicle 100 can be prevented from making changes to suspension settings or ride height adjustment tolerances in response to small variations in terrain. Where block 610 obtains a positive result, process 600 may proceed to block 615, where a height adjustment parameter, e.g., a height adjustment tolerance, may be modified in accordance with the change in surface conditions. Accordingly, subsequent adjustments in ride height, e.g., by way of adjustments to the air springs 104, may be affected. Alternatively, if block 610 obtains a negative result, process 600 proceeds back to block 605. Accordingly, process 600 generally may continuously monitor the surface conditions during operation of the vehicle 100.

Example roughness metrics, e.g., as determined using processes 500 and/or 600, may be used to scale or adjust a height adjustment of the vehicle 100, e.g., a height adjustment tolerance of a levelling feature of the vehicle 100. Moreover, the tolerance adjustment may be performed in accordance with performance desires or expectations for the vehicle 100. Merely as one example, to the extent the vehicle 100 is designed for off-road or other non-road surfaces that are expected to be rough, the vehicle 100 may adjust tolerances more significantly. Generally, where a roughness metric is relatively greater, an extent and/or a frequency with which height adjustments are made to the vehicle suspension may be reduced in comparison to relatively smoother roads or smaller roughness metrics. Furthermore, to the extent a vehicle occupant or driver requests a change to the suspension, the roughness metric may be used to reduce the extent of or pause entirely the requested adjustments of suspension components. Merely as one example, when vehicle 100 determines that roughness is below a predetermined threshold (i.e., indicating a relatively smooth ground surface), a relatively tighter height adjustment tolerance of 2 millimeters may be used for control of vehicle ride height, while a relatively greater height adjustment tolerance of 5 millimeters may be employed when the vehicle 100 determines that the ground surface being traversed by the vehicle 100 is above the predetermined threshold (i.e., indicating a relatively rougher ground surface).

Modifications to suspension system 101 of vehicle 100 may be facilitated by, for example, changing tolerances, control parameters or methodologies of control as described further in the example processes or systems herein. Merely by way of example, modifications may be facilitated by one or more controllers, electronic control units (ECUs), or the like of vehicle 100 sending instructions to control various aspects of the suspension system 101. For example, vehicle dynamics module 102 may send software instructions to adjust values or types of control targets such as air mass, displacement, pressure, or other mechanical aspects of the air springs 104 and/or other components of suspension system 101. Facilitating modifications to suspension system 101 of vehicle 100 may be performed in any manner that is convenient. In an example, facilitating modifications to suspension system 101 of vehicle 100 may be performed by implementing a height change parameter, e.g., to alter a tolerance associated with height changes, such as by adjusting a gain of a controller. In another example, facilitating modifications to suspension system 101 of vehicle 100 may be performed by altering a height axle control methodology or mode of the suspension system 101, e.g., by switching from an average axle control methodology to an independent axle control methodology, or vice versa. In still another example, facilitating modifications to suspension system 101 may be performed by changing a control parameter for a height change, e.g., changing from a displacement control to an air mass control, or vice versa.

Example roughness metrics as determined herein may provide benefits beyond load levelling aspects of a vehicle suspension system. For example, it may be beneficial to record or store roughness observed by a given vehicle over time. Furthermore, to the extent the roughness metric evidences an outlier event or conditions of a vehicle, the metric may be broadcast from the vehicle to provide a notification of the vehicle conditions. Additionally, as noted above other vehicle systems may employ the roughness metric, e.g., an adaptive damping controller of the vehicle, which may alter damping characteristics of the vehicle suspension.

As noted above, in some example approaches vehicle 100 may be configured to facilitate identification of incorrect vehicle or suspension installation or setup in certain environments. In an example, a controller such as the vehicle dynamics module 102 is configured to determine the vehicle is in a service environment and set a height precision mode for the suspension system based on the determination the vehicle is in the service environment. The controller may also be configured to identify an optimal one of the plurality of height precision modes based on the suspension system operating condition/environment, e.g., detecting that the vehicle is in a service environment, and to modify the suspension system to be in the determined height precision mode. In examples herein, a service environment may include a location for service such as a manufacturing facility or vehicle assembly facility, or a vehicle dealership or service station. The service environment may be detected, for example, by the use of a notification provided by service personnel to the vehicle 100 or controller thereof, e.g., by setting a flag recognized by the vehicle dynamics module 102 to indicate that the vehicle 100 is in a service environment. In another example, a proximity of a sensor associated with service environments may be detected by the vehicle automatically. In another example, GPS coordinates of the vehicle may be matched to a known service location associated with the manufacturer of the vehicle. Accordingly, in these examples the vehicle 100 may be notified of the service environment automatically. As examples herein are generally directed to identification and correction of suspension system adjustments, in at least some examples service environments may be identified to the extent they are capable of performing suspension system adjustments, e.g., they have appropriate tools, trained personnel, etc. to correct problems or issues of the suspension system of the vehicle 100 or components thereof.

It should be noted that a detection of a service environment need not be immediately implemented for making adjustments to vehicle suspension. For example, the vehicle may implement the changed adjustment when the vehicle is being serviced and not merely sitting in the parking lot, e.g., when a customer initially arrives. In an example, service personnel may place the vehicle in a service mode, or an ECU or controller of the vehicle 100 may detect that the vehicle is within a threshold proximity to a service machine (e.g., lift, service computer, etc.) to cause the suspension system 101 of the vehicle to be adjusted. In another example, the vehicle 100 may detect a proximity to a service center, dealership, or the like, and in response to the detection make available to the driver or service personnel a service mode of the vehicle 100. In other examples, the vehicle 100 may implement changes regardless whether the vehicle 100 is being serviced. In this manner, if a vehicle 100 is brought to a service environment, e.g., at a dealership, for some other reason, the vehicle may automatically initiate the adjustment to make the underlying issue, e.g., suspension component out of specification, more apparent in the presence of service personnel who are trained to notice that there is a problem and/or to correct it.

Figure 7:
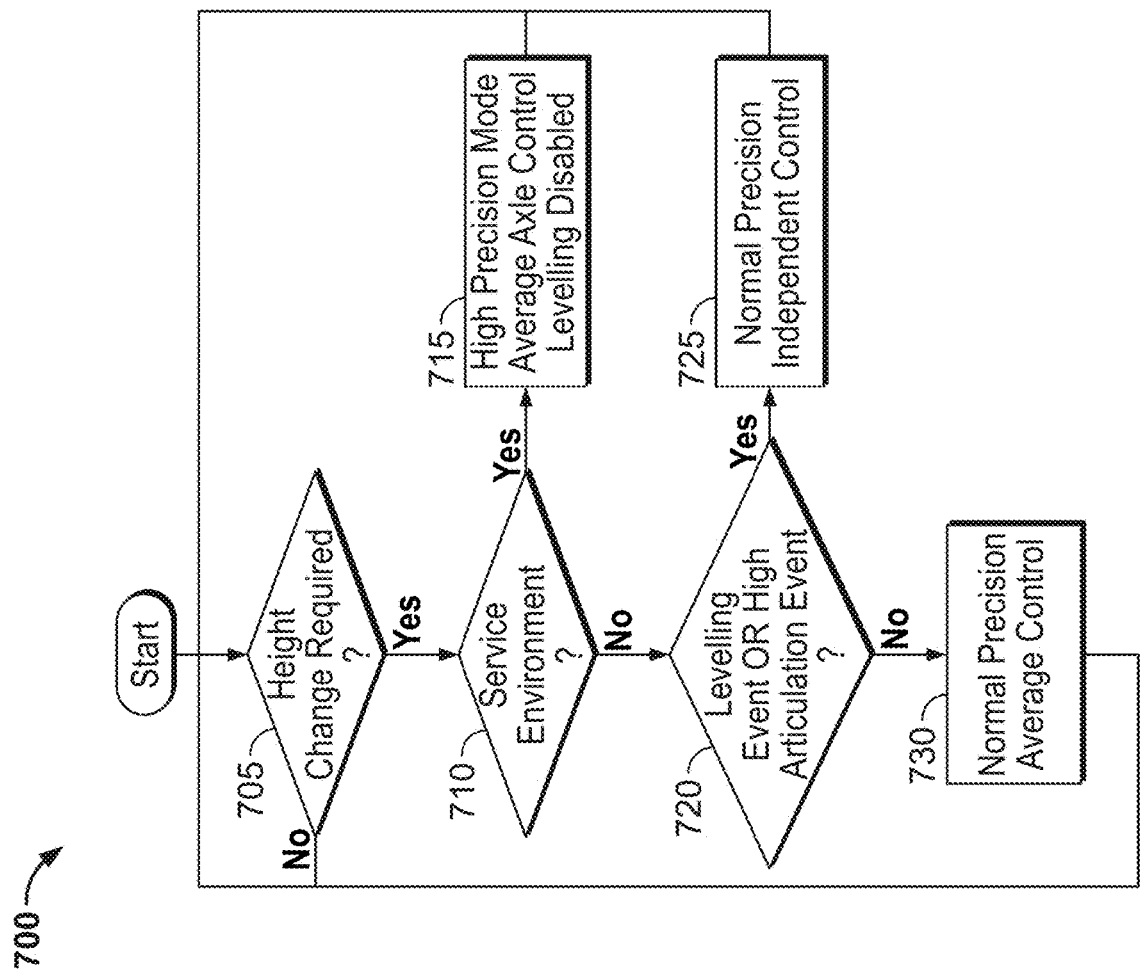
FIG. 7 shows a process flow diagram for a method of altering suspension settings, according to an example.

Referring now to FIG. 7, an example process 700 for altering suspension settings is illustrated and described in further detail. At block 705, process 700 queries whether a height change is required. If a height change is not required, process 700 may proceed back to block 705, thereby monitoring for any required height change. Where a height change is required, process 700 proceeds to block 710.

At block 710, process 700 queries whether vehicle 100 is in an environment requiring high precision for levelling adjustments, e.g., a service environment or a manufacturing environment. As noted above, in one example, the vehicle 100 may set a service or manufacture flag that persists for a period of time, e.g., 24 hours, upon activation by manufacturing or service personnel, detection by the vehicle 100 that it is in/near a service environment, etc., or otherwise in any manner described herein. If block 710 determines that the vehicle is in a service/manufacturing environment, process 700 may then proceed to block 715.

At block 715, a high-precision mode of the air suspension levelling system may be enacted, relying upon an independent control of each of the air springs 104. In this manner, levelling adjustments may be made generally with a relatively greater amount of precision, facilitating identification of issues caused by incorrectly installed components. As one example, where a suspension bushing is over-torqued during installation or service, a levelling event of the vehicle and resulting relative increase of vehicle corner weight(s) at associated air spring(s) 104 and/or wheel(s) of the vehicle may evidence the issue. By increasing precision of the levelling control system in this environment, the vehicle 100 may be more aggressive with levelling adjustments, thereby exacerbating any resulting corner weight differences caused by the levelling and underlying suspension condition. Additionally, process 700 may disable average axle control levelling at block 715, such that each of the air springs 104 are independently adjusted for height. In this manner, corner weight differences from side to side in the vehicle are also more easily observed, in addition to those observed between front/rear wheel corner weights. The increased accuracy of the high-precision mode and the use of independent control for each air spring 104 may help identify the source of the underlying problem, e.g., by isolating a particular wheel/air spring 104 where a corner weight of the vehicle 100 is particularly heavy/light in relation to the other corner weights.

In at least some examples herein, the vehicle 100 includes a plurality of height precision modes having different corresponding control tolerances. For example, in addition to the high-precision mode of the air suspension levelling system, a low-precision (relative to the high-precision mode) mode may be available for other situations/settings, as will be discussed further below.

Where block 710 determines that the vehicle is not in a service or manufacturing environment (or, for that matter, other environment where high-precision control of levelling is unnecessary), process 700 may proceed to blocks 720-730, in which a reduced precision control methodology for height changes is used. For example, a smaller precision control methodology (e.g., to a height adjustment tolerance of 5 millimeters, instead of a higher-precision height adjustment tolerance of 2 millimeters) may prevent excessive automatic levelling of the vehicle 100.

At block 720, process 700 queries whether the required height change determined at block 705 is the result of an automatic levelling event (i.e., an automatic correction of the vehicle 100 in response to loading the rear or side of the vehicle, for example) or a high-articulation event. A high-articulation event may be defined as a movement or articulation of a single wheel, i.e., an individual wheel articulation, that exceeds a predetermined relative articulation threshold. A relatively high-articulation event may be indicative of (i.e., where the suspension travel exceeds a predetermined minimum or predetermined relative articulation threshold), merely as examples, off-road operation or other extreme inputs to the vehicle suspension. In either case, it may be desired to employ an independent control of each of the air springs 104 and/or associated wheels. More specifically, conditions creating a need for an automatic levelling event generally cannot be assumed to apply equally to both driver and passenger sides of the vehicle 100, e.g., the vehicle has been heavily loaded on the driver's side of the rear cargo area, and as such it is desired to ensure the vehicle 100 is level from side to side. Additionally, a high-articulation event may also warrant independent control of the air springs 104 and/or wheels. Where block 720 determines that one of a levelling event or high-articulation event is present, process 700 may proceed to block 725. At block 725, the vehicle 100 employs a normal precision, independent control methodology, in which the control tolerances of the adjustments are within normal parameters. In an example, the relatively lower precision of the normal-precision control methodology (e.g., to within 5 millimeters of the target position, as opposed to within 2 millimeters of the target position for high-precision control) is configured to prevent overcorrection by the vehicle 100 and/or suspension system when it may not be needed. It should be noted that an average axle control (e.g., as described above at block 715) may be disabled at block 725 in response to the decrease in the control tolerance, such that the vehicle 100 employs independent control.

Alternatively, if process 700 determines at block 720 that neither a levelling event nor a high-articulation event have precipitated the need for a height change, the vehicle 100 may employ an average axle control methodology and proceed to block 730. Accordingly, adjustments are made to the vehicle height on the basis of the average adjustment required measured at each wheel on a given axle. The average axle control methodology may be useful, for example, where a height change is initiated by a newly selected ride mode or drive mode change, e.g., a selection of an off-road mode that increases vehicle ground clearance. In these situations, it is unlikely that a side-to-side variation in the vehicle 100 caused the height change. As such, the average axle methodology generally prevents side-to-side adjustments of the vehicle 100 where they are not expected to be necessary. Generally, equal corner weights may be more easily achieved with the above average axle control adjustment, which may result in the best vehicle setup for dynamic behavior. Accordingly, to the extent dynamic behavior is prioritized when the driver requests a change, the average axle control methodology may improve the ability of the vehicle to adjust to the correct height more quickly.

Figure 15:
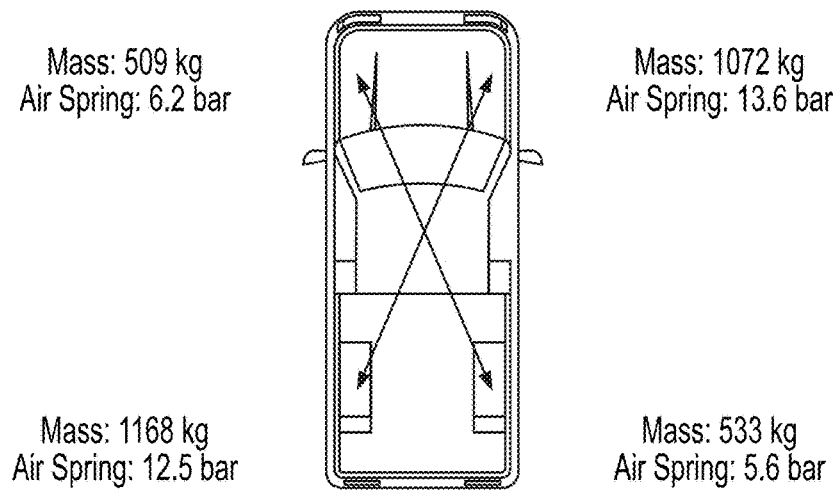
FIG. 15 shows a schematic illustration of a vehicle having an air suspension system that is over-constrained.

Turning now to FIGS. 8 and 9, correction strategies for levelling corrections to the vehicle 100 are illustrated and described in further detail. Generally, vehicle 100 may seek to address suspension correction conditions associated with the suspension system 101. Merely as examples, changes in distribution of cargo, passengers, etc. in the vehicle 100 may cause the vehicle 100 to lean side to side, or to pitch toward the rear of the vehicle 100 ("squat") or front of the vehicle ("dive"). A suspension correction condition may include such a lean or pitch of the vehicle, which the vehicle 100 seeks to correct by adjusting pressure of one or more air springs 104. In the approach illustrated in FIG. 8, an individual corner control (i.e., where each air spring 104 is independently controlled to a target height) can induce diagonally-asymmetric corner weights due to an over-constrained system of vehicle 100. The over-constrained system, in this example, results from the vehicle 100 having four wheels and associated air springs 104, as three points define a plane, adjustments made to one of the four air springs 104 may affect measured height and/or wheel weights of one or more of the other air springs 104 and/or associated wheels. An illustration of an over-constrained vehicle is provided in FIG. 15. In the example, different wheel weights and pressures at the four wheel locations can result in an ongoing process where the vehicle makes a height adjustment to a wheel, thereby altering the wheel weight of another wheel and creating a need for a height or pressure adjustment at that wheel. In the correction strategy pictured in FIG. 8, individual corner control (i.e., independent axle control methodology) may be employed for levelling corrections applied in response to, pitch corrections, excessive, insufficient, or incomplete height corrections, and corner height corrections, while average axle control (i.e., where the correction determined for the two wheels of a single axle is averaged, which each applied to the air springs 104 associated with the two wheels of the axle) is employed for execution of ride height changes. Employing the individual corner control in response to the indicated situations, however, can induce diagonally-asymmetric corner weights. Increasing precision of the control, e.g., by reducing a tolerance for error in ride height, may exacerbate the problem. In some cases, alignment capability is impacted.

Accordingly, in FIG. 9 an illustrative example is provided of a correction that addresses the problems experienced in the strategy illustrated in FIG. 8. Generally, in contrast to the approach illustrated in FIG. 8, the approach illustrated in FIG. 9 employs individual corner control only for incomplete corner height corrections that, e.g., which cannot be resolved with an initial attempt using average axle control. More specifically, individual corner control is allowed only for subsequent attempts to correct height(s). Average axle control is thus employed to effect ride height changes, pitch corrections, excessive/insufficient height corrections, as well as initial attempts at a corner height correction or a high-precision corner height corrections. In other words, height corrections can initially be made using average axle control, with a subsequent attempt (e.g., if the first attempt using average axle control is not effective enough to reduce the error) being made using individual corner control. It should be noted that in some examples a relatively higher-precision control mode (i.e., with a relatively smaller tolerance for ride height error) is not employed during normal vehicle operation. Additionally, when the vehicle 100 determines it is present on flat surface or levels of twist are relatively low, average axle control may be employed, while individual corner control may be employed. In this manner, asymmetry induced by non-flat surface may be reduced or eliminated. The same approach may be employed for pitch corrections, i.e., average axle control being employed when ground is flat or levels of twist are relatively low, with individual corner control being employed when ground is relatively less flat (or levels of twist are above a threshold). When correcting for a relatively steep bank or grade (e.g., a bank or grade above a predetermined value), individual corner control may also be imposed rather than average axle control. Furthermore, roll corrections may in the example illustrated rely upon individual corner control since the vehicle 100 leaning on one side may introduce asymmetry if average axle control is employed.

Figure 16A:
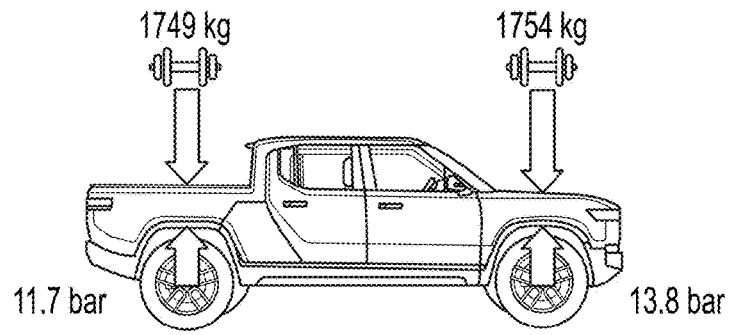
FIG. 16A shows a schematic illustration of a vehicle having an unequal weight distribution upon front and rear wheels of the vehicle, and corresponding air suspension pressures.
Figure 16B:
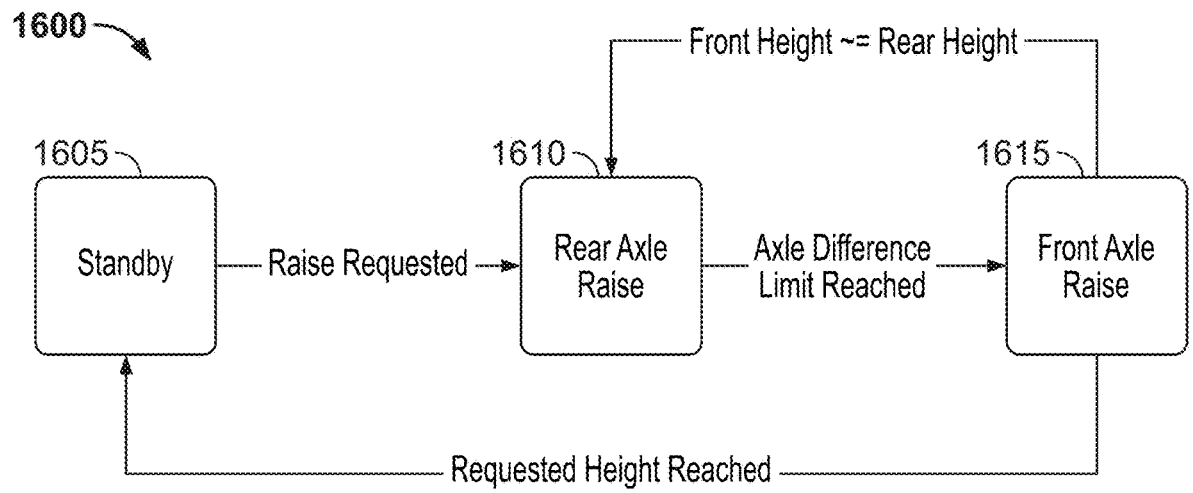
FIG. 16B shows a process flow diagram of a method of adjusting ride height of a suspension system of the vehicle of FIG. 16A, in accordance with an example illustration.

In should be noted that in some examples, axle height adjustment control is performed independently on the two axles of a vehicle due to the unequal air pressures in each. For example, as illustrated in FIG. 16A, internal pressures of air spring(s) 104 of different axles may be different to a greater degree than the weight distribution between a front axle and rear axle of the vehicle. More specifically, in the example illustrated, the vehicle is shown having a front/rear weight distribution that is nearly balanced, i.e., with very slightly more than 50% of the vehicle's weight on the front axle, and very slightly less than 50% on the rear axle. Nevertheless, the air pressures of the front axle and rear axle are more significantly different. As a result, it may be beneficial to control height adjustments of the front and rear axles independently. More specifically, as illustrated in an example process 1600 in FIG. 16B, initially a vehicle may be in a standby mode at block 1605. In response to a request for a raise in height of the vehicle 100, e.g., automatically by the vehicle or manually by a vehicle driver, process 1600 may proceed to block 1610. At block 1610, the vehicle may initially raise the rear axle until either the overall/requested height adjustment is reached, or a permissible height difference between the axles is reached. In cases where the permissible axle height difference limit between the axles is reached as the rear axle is being raised, process 1600 may proceed to block 1615, where the front axle is raised to an approximate equal height as the rear axle. Proceeding back to block 1610, the rear axle may then be raised further. Process 1600 may, accordingly, proceed between blocks 1610 and 1615 to the extent necessary to complete the height adjustment (i.e., process 1600 moves to block 1615 if the permissible height difference between the axles is reached, and back to block 1610 if the front and rear heights are equalized without reaching the requested height). In this manner, the front and rear axles may be adjusted incrementally in an alternating fashion until the height adjustment is completed, with process 1600 then proceeding back to block 1605. Accordingly, in some examples the vehicle dynamics controller 102 may implement height changes at two different axles, i.e., the front/rear axles, within an axle height difference limit. More specifically, a first height change is initiated at a first one of the two axles, e.g., the rear axle, until the axle height difference limit is reached. Subsequently, a second height change may be initiated at a second one of the two axles, e.g., the front axle, until one of the height difference limit or an overall height change is reached. In cases where the second height change, e.g., to the front axle, is insufficient to achieve the requested height change, i.e., the second height change is initiated until the height different limit is reached, a third height change may be initiated, e.g., at the rear axle. Undesirable or extreme height differences between the axles may be minimized by employing this example alternating-axle, incremental approach. In an example, a permissible height difference between the front/rear axles may be altered according to vehicle conditions. For example, a vehicle may employ a first permissible height difference (e.g., 20 millimeters) while the vehicle is being operated or driven, which is relatively smaller than another permissible height difference (e.g., 40 millimeters) used during other times when the adjustments are less likely to be noticed by vehicle passengers.

Figures 10, 11:
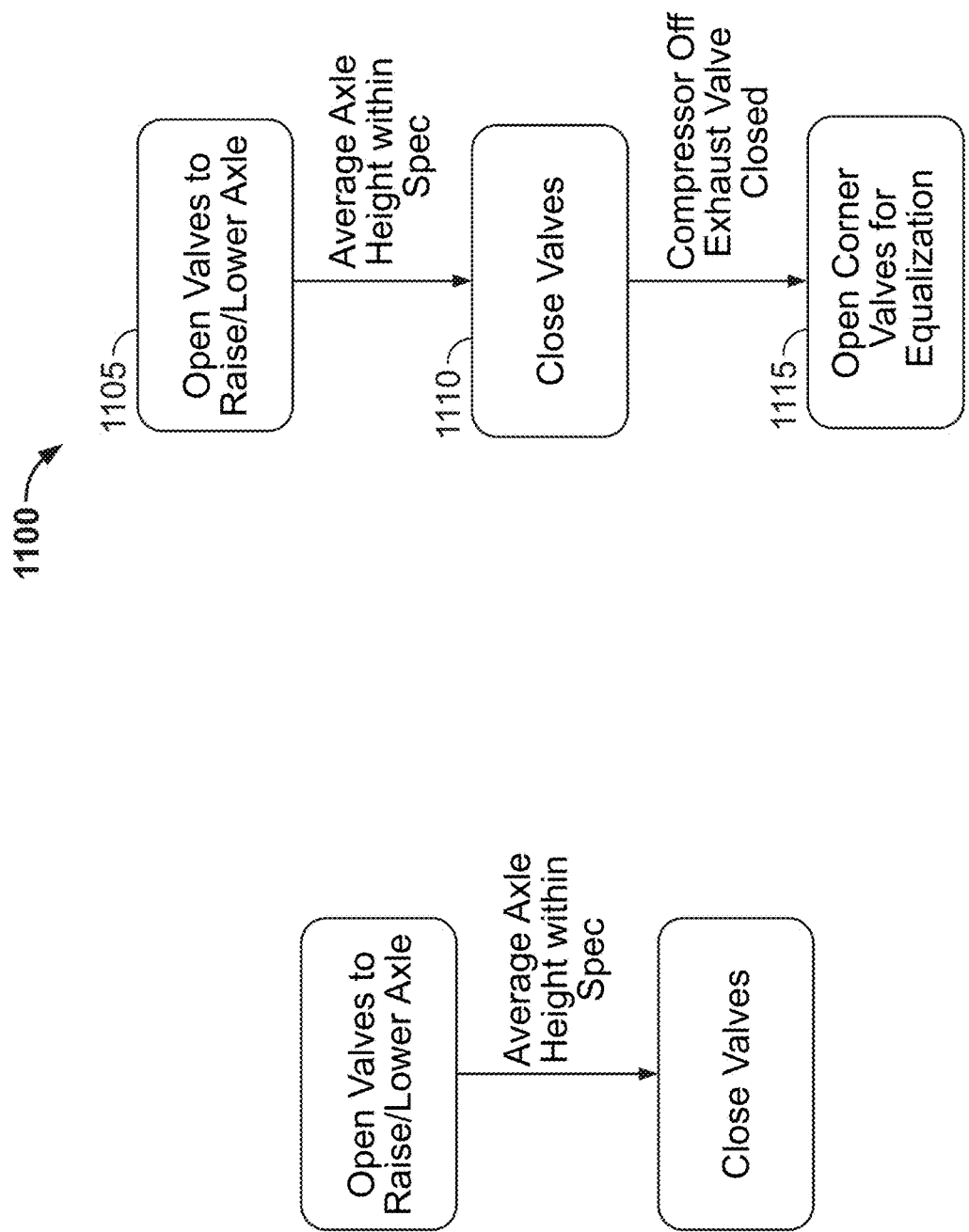
FIG. 10 shows a process flow diagram for a method of adjusting a ride height of a suspension system for a vehicle.
FIG. 11 shows a process flow diagram for a method of equalizing air spring pressures in a suspension system for a vehicle, in accordance with an example illustration.

Turning now to FIGS. 10 and 11, a problem arises at times in an air suspension system where air pressures of the air springs 104, e.g., on a single axle, are not necessarily equal due to different circuit impedances. As illustrated in FIG. 10, one approach exemplified includes opening valves, e.g., of an air spring 104, to raise or lower an axle. After the axle is determined to be within a specified tolerance range of the target height, the valves may be closed. In some cases, using the approach outlined in FIG. 10 may result in different internal pressures in the air springs 104 of the axle. Turning now to FIG. 11, in an example process 1100, one solution to the problem illustrated in FIG. 10 is to subsequently equalize pressure of the air springs 104 of a given axle, i.e., after implementing a height change at the axle using the air springs 104 associated with opposite wheels (not shown) of the axle. More specifically, process 1100 may begin at block 1105, where one or more valves are opened to raise or lower an axle of vehicle 100. Proceeding to block 1110, the valves may be closed upon detection that the average axle height is within a target or specification. Proceeding to block 1115, with the compressor 106 off and an exhaust valve closed, valves of the associated air springs 104 at each corner of the axle may be opened to allow equalization of the pressure in each of the air springs 104 of the axle. Process 1100 may then terminate.

Figure 12:
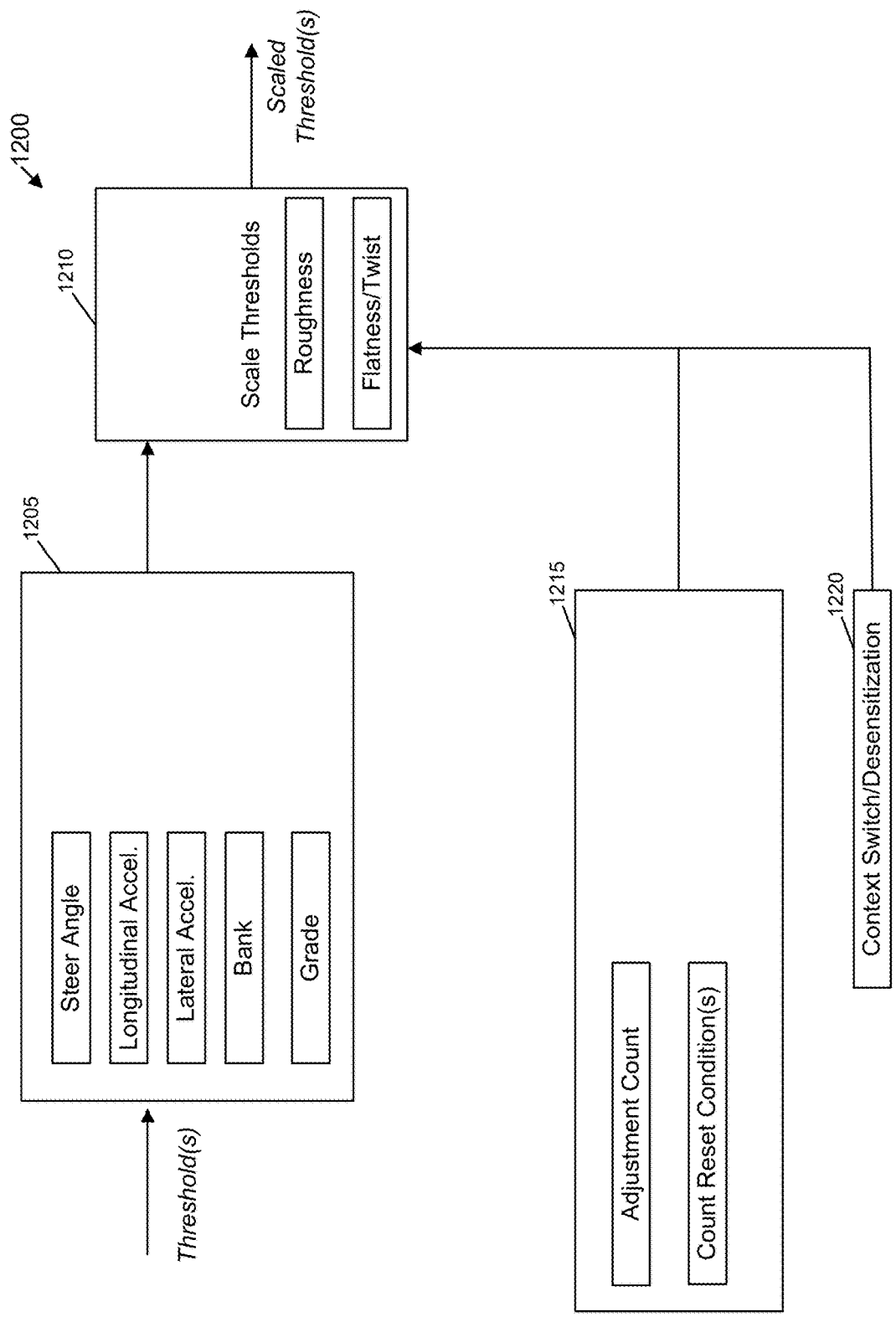
FIG. 12 shows a control strategy for addressing overcorrections of an air suspension system of a vehicle, according to an example approach.

Turning now to FIG. 12, an example control strategy 1200 for addressing over-corrections of an air suspension system of vehicle 100 is illustrated and described in further detail. More specifically, in some cases mild dynamic maneuvers of the vehicle 100 may induce the air suspension system to make levelling corrections to the vehicle 100 that may not be necessary. In this example, a height control target of 5 millimeters (mm) is employed, i.e., such that variations of greater than 5 mm may induce levelling response by the vehicle dynamics module 102. Mild dynamic maneuvers may induce movements that exceed the control target, e.g., 5 mm, which could cause intervention by the vehicle dynamics module 102 which are generally not desired. Attempts have been made to compensate based upon acceleration of the vehicle, e.g., along the vehicle longitudinal or lateral axis, however "false positives" where the vehicle dynamics module 102 interprets mild dynamic maneuvers as requiring levelling correction may still occur. In a further effort to reduce the extent to which the levelling system may attempt to correct in these mild dynamic situations, applicable thresholds for intervention may be scaled based upon other factors, either as alternatives or in addition to scaling applied based upon accelerations of the vehicle 100. In the example illustrated in FIG. 12, thresholds for levelling interventions may be scaled based upon various suspension operating conditions such as roughness or flatness/twist.

In the example control 1200 illustrated in FIG. 12, at block 1205 suspension operating conditions may include steer angle of the vehicle 100, longitudinal acceleration of the vehicle 100, lateral acceleration of the vehicle 100, bank of a surface being traversed by the vehicle 100, and grade of the surface. These factors may be used to scale thresholds in combination with roughness and/or flatness/twist, which may be applied to scale thresholds at block 1210. Accordingly, in the example illustrated in FIG. 12, each of these suspension operating conditions are used to change one or more settings associated with the suspension system. While in this example settings may include thresholds that are scaled according to roughness, flatness/twist, lateral acceleration, longitudinal acceleration, steer angle, bank, and grade, any other factors may be relied upon that are convenient.

Generally, suspension operating conditions may be used to provide a calibratable relationship between surface conditions, e.g., roughness and/or twist, and de-sensitization of height adjustments of the vehicle 100 and/or suspension system 101. Additionally, desensitization may be used generally to correct for or prevent overcorrections of vehicle height or adjustments as mentioned above. For example, if a single one of the air springs 104 is out of range and a correction is made, in a four-wheeled vehicle this will necessarily cause a redistribution of vehicle weight that will affect the other air springs 104. As a result, it is possible for the adjustments to one air spring 104 of the suspension system 101 to create the need for an adjustment to another of the air spring 104. Accordingly, the vehicle 100 may detect the occurrence of these repeated adjustments, and further adjustments may be de-sensitized (e.g., to increase acceptable tolerances/ranges for height adjustment) in an effort to more quickly stop the vehicle or suspension "hunting" further adjustments.

In the example control 1200 illustrated in FIG. 12, at block 1215 a count of adjustments made by the vehicle 100 may be used to track height adjustments by the vehicle 100. As the number of height adjustments in a period of time go up, the control 1200 may increase tolerances, thereby reducing the degree to which the vehicle 100 seeks to make additional height changes. This adjustment count may thus be employed to prevent potential "hunting" by the vehicle 100, as described above. The adjustment count may reset or be reduced upon the vehicle 100 coming to a stop or other changed condition indicating the vehicle 100 should determine whether further height adjustment(s) should be made. In this manner, thresholds of the suspension system 101, e.g., a height adjustment threshold, may be scaled in response to a detection of the vehicle 100 making too many adjustments to vehicle height within a given period of time.

At block 1220, a context switch is employed to emphasize or ignore dynamic desensitization. More specifically, if it is known that heights measurements are reliable while the vehicle 100 is in motion, then an assumption can be made that the height measurements are still reliable when the vehicle 100 comes to a stop, and as a result all desensitization can be applied when the vehicle 100. On the other hand, if it is known that height measurements are not reliable while driving, the vehicle 100 may not be able to make adjustments. Accordingly, in this example, the vehicle 100 may finish making adjustments when the vehicle 100 stops. For example, the vehicle stopped indicator of block 1215 may cause desensitizations to be eliminated, and flatness is used as the sole scaling factor with respect to thresholds.

Examples of scaling of thresholds as set forth above will now be discussed in further detail. In the examples that follow, a height adjustment tolerance may be approximately 7.5 millimeters (mm) while driving (i.e., when speed of the vehicle 100 is above zero), and may be relatively greater while vehicle 100 is stopped (e.g., 10 mm). Additionally, a greater tolerance yet may be applied while the vehicle 100 has its brakes applied (due to binding of suspension components that may occur while applying brakes).

In a first example where roughness is used to scale a height adjustment threshold, an amount of roughness determined may be used to scale a gain associated with the standard input tolerance (e.g., 10 mm when the vehicle 100 is stopped). The gain may be applied such that it is gradually phased in to increase tolerance minimally in response to relatively low roughness, and then rapidly increased as a higher degree of roughness is detected. For example, as illustrated in Table 1 below, when roughness determined to be below 30 percent, zero gain is applied such that the standard tolerance range of 10 mm is used. Increases of roughness to 30 percent may increase minimally as reflected below, while roughness above 50% causes an extremely large increase that effectively reduces or eliminates height adjustments by the vehicle 100.

TABLE 1

| Roughness | |
| --- | --- |
| Roughness (%) | Gain |
| 0 | 0 |
| 30 | 0.1 (e.g., 11 mm instead of 10 mm) |
| 40 | 2.0 (e.g., 30 mm instead of 10 mm) |
| 50 | 10.0 (e.g., 120 mm instead of 10 mm) |

It should be noted that, by comparison, maximum travel of an air spring 104 of vehicle 100 may be on the order of 120-150 millimeters in both up/down directions. In one example, maximum travel from a nominal position at standard height is such that the air spring 104 may allow wheel jounce upward by 150 mm, and wheel rebound downward from the nominal position by 120 mm. Accordingly, in the example set forth above in Table 1, at higher levels of roughness adjustments almost entirely phased out.

Gains associated with height adjustment thresholds may be scaled in response to other factors. For example, flatness or twist may be used as set forth in Table 2, below, to scale a height adjustment threshold. Again, gain may be applied such that it is gradually phased in to increase tolerance minimally in response to relatively levels of twist or relatively flat surfaces, and then rapidly increased as higher amounts of twist is detected. In the example illustrated in Table 2 below, when twist is determined to be below 20 millimeters, zero gain is applied such that the standard tolerance range is used. Increases of twist to 30 mm may increase gain minimally as reflected below, while twist above 100 mm causes an extremely large increase that effectively reduces or eliminates height adjustments by the vehicle 100.

TABLE 2

| Twist/Flatness | |
| --- | --- |
| Twist (mm) | Gain |
| 0 | 0 |
| 20 | 0.1 (e.g., 11 mm instead of 10 mm) |
| 30 | 1.0 (e.g., 20 mm instead of 10 mm) |
| 100 | 10.0 (e.g., 120 mm instead of 10 mm) |

As another example of scaling height adjustment thresholds in response to detected conditions, lateral acceleration may be used to reduce or eliminate interventions by vehicle 100 and/or suspension system 101 during relatively high lateral acceleration. An example is set forth in Table 3, below, to scale a height adjustment threshold. Again, gain may be applied such that it is gradually phased in to increase tolerance minimally in response to relatively low levels of lateral acceleration, and then rapidly increased as higher amounts of lateral acceleration are detected. In the example illustrated in Table 3 below, when lateral acceleration is determined to be below 0.5 m/s', zero gain is applied such that the standard tolerance range is used. Increases of twist to 30 mm may increase gain minimally as reflected below, while twist above 100 mm causes an extremely large increase that effectively reduces or eliminates height adjustments by the vehicle 100.

TABLE 3

Lateral Acceleration

| Lateral Acceleration (m/s$^2$) | Gain |
|---|---|
| 0.5 | 0 |
| 3.0 | 3.0 (e.g., 40 mm instead of 10 mm) |
| 10 | 10.0 (e.g., 120 mm instead of 10 mm) |

It should be noted that in some examples, vehicle 100 may cut off height adjustments when lateral acceleration of the vehicle 100 is above a relatively low threshold, e.g., below 3.0 m/s$^2$, to prevent a vehicle exiting a corner in a "rolled" condition as a result of the lateral acceleration.

Figure 13:
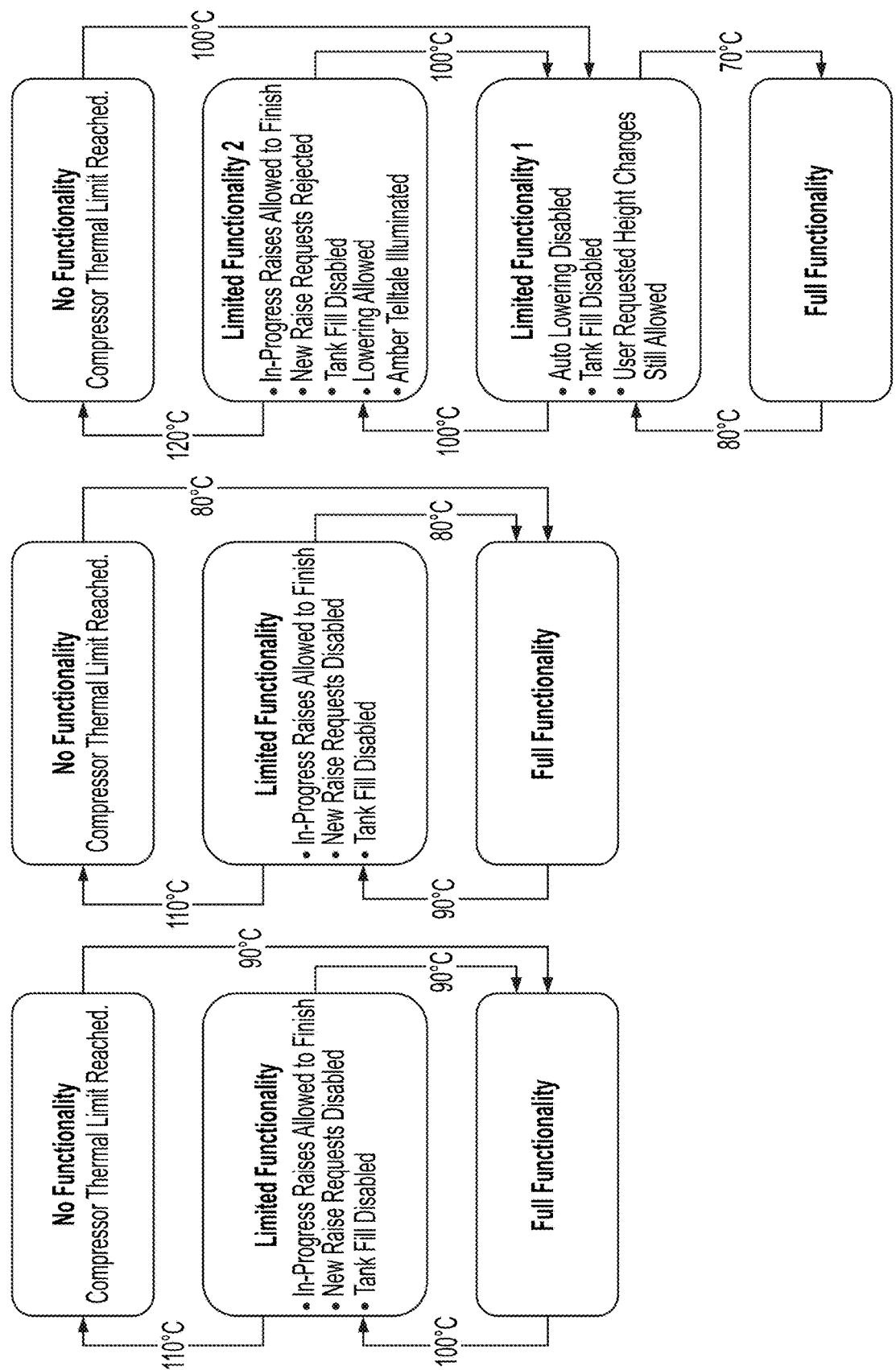
FIGS. 13A, 13B, and 13C each show strategies for reducing activity of a suspension levelling system, e.g., in a vehicle, in accordance with respective example approaches.

Turning now to FIGS. 13A-13C, example strategies for reducing activity of a suspension levelling system, e.g., in vehicle 100, are illustrated and described in further detail. Generally, temperature, e.g., an ambient temperature of the vehicle 100 or operating temperature of a components of the vehicle 100, may be detected as a suspension operating condition, and the controller, e.g., vehicle dynamics module 102, may be configured to reduce a suspension activity in response to a detection of a temperature above a predetermined threshold. Further, in examples below the vehicle dynamics module 102 and/or other controller of vehicle 100 may be configured to change suspension activity between a plurality of discrete suspension activity categories, with each of the discrete suspension activity categories including one or more suspension operating parameter adjustments.

In each of the three example strategies illustrated in FIGS. 13A, 13B, and 13C, respectively, certain functions of the vehicle 100, particularly of the air suspension, may be reduced in response to rising operating temperatures of the compressor or other components (e.g., due to rising ambient temperatures) and a suspension functionality level may be changed in response. One example suspension functionality level includes a "full functionality" level of service (e.g., in which an air compressor of the vehicle, e.g., compressor 106, is permitted to fill a tank or reservoir anytime the vehicle is not in park, to raise the vehicle if the tank is depleted, and may enact speed-based raising/lowering of the vehicle). The suspension functionality level may be reduced from the full functionality level to other, more reduced levels of suspension functionality or activity in response to detected conditions. In some examples, reduced levels of suspension functionality may generally be used to prioritize driver requested height changes over automatic height changes or corrections as the temperature of the hardware increases. These reductions to certain functions or activities may prevent damage to components of the vehicle 100, e.g., air compressor 106, due to operation in elevated temperatures, or to preserve electrical power of a battery pack of the vehicle 100. As shown in each of FIGS. 13A, 13B, and 13C, upon the vehicle 100 or suspension components reaching various temperature thresholds, the vehicle 100 may limit functions of the vehicle 100 and/or air suspension system as noted in the "limited functionality" boxes, which provide other examples of a suspension functionality level. Accordingly, the discrete suspension functionality levels may include at least the "limited" box, and in some examples may include additional categories discussed further below. Upon reaching a subsequent temperature threshold above the first, additional functions of the air suspension system may be limited, e.g., as noted in the "limited functionality 2" box of FIG. 13C, or functions of the air suspension system may be ceased entirely. In the "no functionality" suspension functionality level, the vehicle 100 may be operable but without the ability to modify ride height or other settings of the air springs 104 and/or the suspension system.

Figure 14:
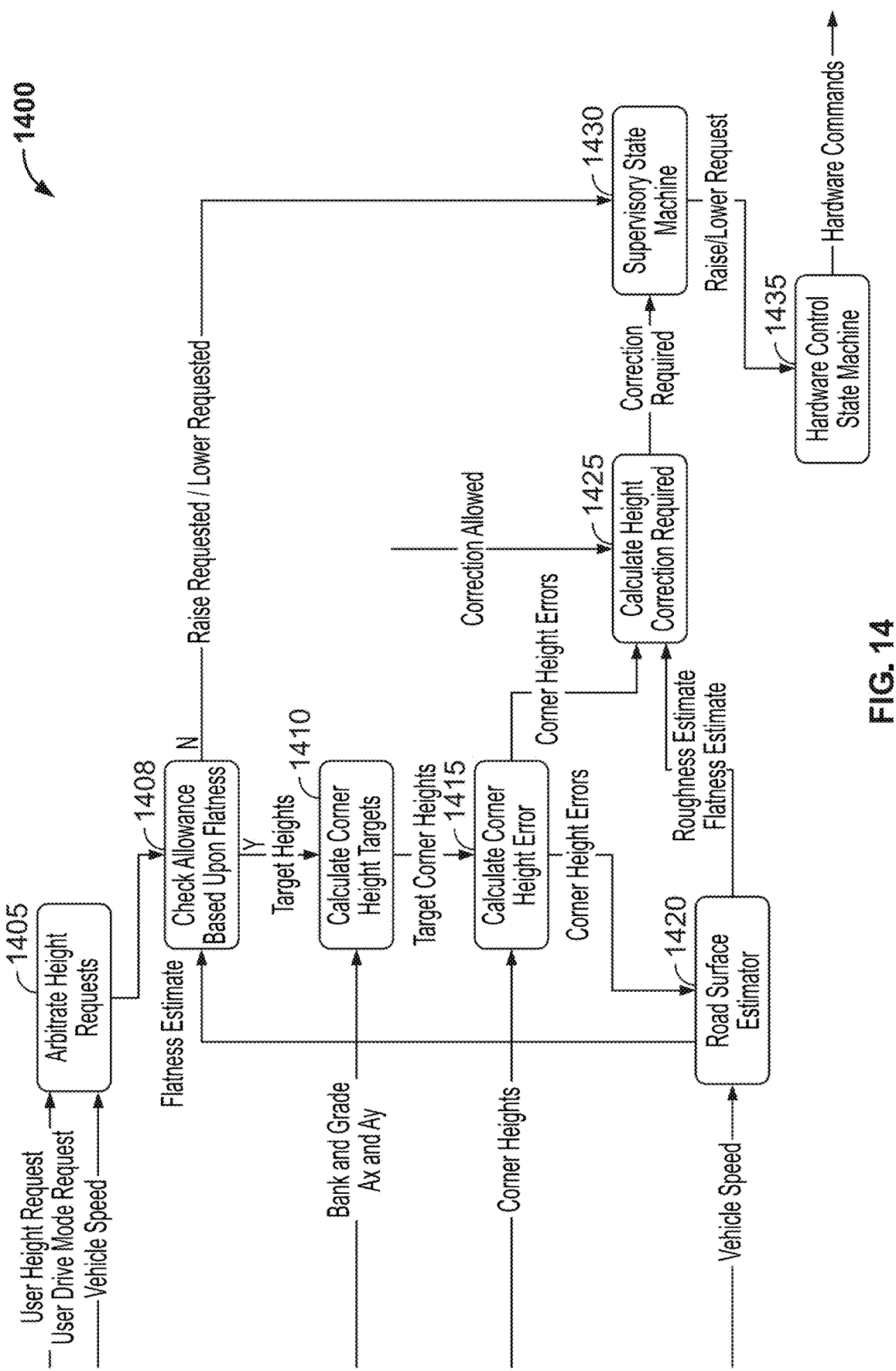
FIG. 14 shows a process flow diagram of a method of adjusting ride height of a suspension system of a vehicle, in accordance with an example illustration.

Turning now to FIG. 14, an example process 1400 for a vehicle controller or system, e.g., of vehicle 100, an air suspension system, or associated control system, is illustrated. The example vehicle may employ determinations discussed above. Accordingly, process 1400 may be embodied on vehicle dynamics module 102, or any other controller of vehicle 100 that is convenient.

Process 1400 may begin at block 1405, where generally, user height requests, user drive mode requests, and vehicle speed may be inputs to an arbitration of the height requests. A target height may be output.

At block 1408, process 1400 may use a measurement of twist or flatness, e.g., as described above, to determine whether a height change should be rejected. More specifically, based upon determination of surface conditions at block 1420 as described below, process 1400 set a flag for process 1400 (e.g., at block 1425) to allow height changes if twist of the vehicle 100 is below a threshold amount. In this manner, height changes may be selectively rejected by the supervisory state machine 1430 if the flag is not present at block 1425.

Proceeding to block 1410, the target height may be used to calculate corner height targets, along with a bank and/or a grade. Accordingly, height changes may be made considering effects of a bank and/or a grade of the vehicle may be traversing, e.g., as evidenced by vehicle lateral acceleration. As such, the influence of the bank and/or grade may be removed. Target corner heights may be determined and output to a corner height error calculation. Process 1400 may then proceed to block 1415.

More particularly, at block 1415 target corner heights may be input, along with measured/actual corner heights, to a determination of corner height error. The corner height errors may be used in the roughness calculation, e.g., for a road or any other surface, as well as to calculate a height correction.

More specifically, proceeding to block 1420, vehicle speed may be input along with corner height errors to determine surface conditions, e.g., including a metric of roughness, e.g., as described above in FIG. 5 and the example process 500, as well as a measure of flatness or twist of the vehicle 100 as described above. The roughness estimate may be an input to the calculation of a height correction at block 1425, and as noted above may be provided to block 1408 to determine whether subsequent height changes may be restricted or prevented. If/when a height correction is determined at block 1425, a supervisory state machine at block 1430 may output a raise/lower request based upon the input correction and the requested raise/lower received from the height request arbitration. The raise/lower request is output to a hardware control state machine at block 1435, which outputs hardware commands to implement the raising or lowering, e.g., by air pressure adjustments of the system as described herein. Process 1400 may then terminate.

In example systems such as that illustrated in FIG. 14, ride height changes may be made based upon vehicle speeds and/or modes of operation of the vehicle/suspension system. Ride height adjustments may be made based upon vehicle mode and/or speed, e.g., as illustrated and described further below in FIGS. 17A-17G and 18-21. Generally, various modes of the vehicle 100 may be used to emphasize energy efficiency of the vehicle, particularly where the vehicle is an electric vehicle where electrical power is desired to be conserved, or other desired performance/vehicle qualities. In some examples, vehicle drag may be reduced by lowering height at speed, thereby improving efficiency and range of the vehicle. In the illustrated examples, a ride height of the vehicle may induce speed limits, e.g., such that a relatively high or relatively low ride height or ground height may result in a speed limiting of the vehicle to prevent, merely as one example, exceeding a safe speed when the vehicle has a relatively high center of gravity. Further, load leveling behavior may be based on corner heights in a target window. Load leveling may use the example roughness metrics herein and adjust heights to stay in target windows, with additional logic added for measured height errors, and while accounting for the vehicle being on different steep grades and banks.

In Table 1 below, a plurality of example ride heights are illustrated with corresponding ground clearance and offset distance (from a nominal or standard ride height setting). The settings listed in Table 1 include a "max" setting, a "high" setting, a "standard" setting, a "low" setting, and a "lowest" setting. Generally, a user of vehicle 100 may implement the indicated ground clearances/settings in a given "mode" of the vehicle (e.g., a normal mode, off-road mode, etc.) and then selecting one of the plurality of ride heights. It should be understood that while five different ride heights are illustrated, any number of different settings may be employed, and different ground clearances or offsets may be employed in the plurality of ride heights.

TABLE 4

Ride Height Offsets

| Ride Height | Offset from Standard (mm) |
| --- | --- |
| Max | +90 |
| High | +40 |
| Standard | Nominal (0) |
| Low | −35 |
| Lowest | −50 |

The indicated ground clearances in Table 1 are measured with respect to a front subframe height, which may be a minimum ground clearance of the vehicle and may be relatively lower than a rear subframe height of the vehicle (e.g., to provide a desired stance of the vehicle where a rear of the vehicle is slightly higher than a front of the vehicle).

Referring now to FIGS. 17A-17H, implementation of the vehicle ride heights of Table 1 are described further in different vehicle modes and according to vehicle speed for the vehicle 100. The different modes may be provided, e.g., in vehicle 100, facilitating selection of different strategies for ride height changes based upon speed. Generally, vehicle stability may be enhanced by a speed limit that is imposed by vehicle 100 in response to a ride height. Further, speed limits the vehicle 100 imposes may be communicated to the driver upon selection of a mode or height, so that the driver has the opportunity to confirm or reconsider the height/mode request.

As noted above, vehicle modes and sub-modes may be selected and implemented via a user-interface or display, e.g., as set forth above in connection with FIGS. 3 and 4. In the examples that follow, vehicle 100 includes an all-purpose mode, a conserve mode, a sport mode (having a "launch" sub-mode), and an "off-road" mode (having sub-modes including "auto," "rock-crawl," "drift," and "rally"). As will be described further below, selection of a mode or sub-mode may result in the imposition of a vehicle height limit, e.g., such that the vehicle 100 is not permitted to change ride height above a predetermined height threshold. The various modes and sub-modes may also provide speed limits applicable to certain ride heights, modes, or sub-modes, e.g., selection of a relatively high ride height or vehicle ground height above a predetermined vehicle height threshold may cause a maximum speed limit to be imposed on the vehicle and/or communicated to the operator/driver.

Figure 17A:
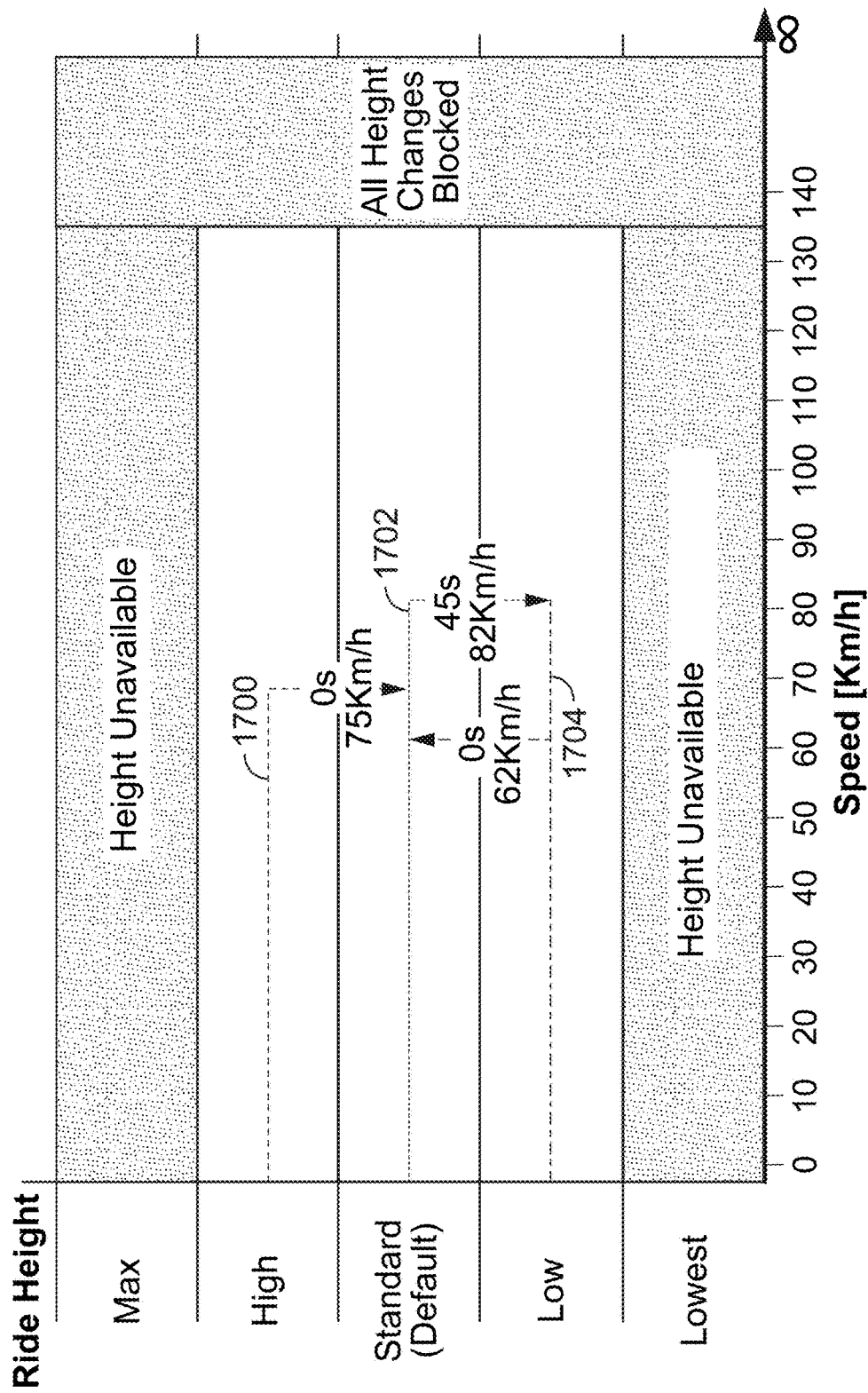
FIG. 17A shows a chart of ride height selections versus vehicle speed in an "all-purpose" ride height control mode, according to an example approach.

A first example illustrated in FIG. 17A is directed to an "all-purpose" mode, in which ride height selections are restricted to the high/standard/low ride heights, e.g., as set forth in Table 1. The all-purpose mode may generally be directed to normal on-road or light off-road applications, and thus may use settings such as ride height and other vehicle limits within nominal ranges.

As shown in FIG. 17A, with vehicle 100 in the all-purpose mode, automatic ride height adjustments may be implemented by vehicle 100 in response to changes in vehicle speed, as indicated by arrows 1700, 1702, and 1704. More specifically, when vehicle 100 is in the "high" ride height setting, acceleration of the vehicle past 75 kilometers per hour (km/h) will cause the vehicle 100 to immediately lower ride height to the "standard" ride height, as indicated by arrow 1700. Further acceleration of the vehicle past 82 km/h will cause the vehicle 100 to lower ride height to the "low" setting after remaining above 82 km/h for 45 seconds, as indicated by arrow 1702. Further, upon decelerating to 62 km/h, vehicle 100 will automatically raise ride height back to the standard ride height, as indicated by arrow 1704. Height changes above 135 km/h may also be prevented, including automatic corrections for levelling as well as height changes requested by a driver/occupant of the vehicle 100. Generally, changes in ride height may be communicated to a driver, e.g., by way of a display in an interior of the vehicle 100. The various limitations on ride height changes illustrated in FIGS. 17A-17G may be imposed by vehicle dynamics module 102 and/or other modules or controllers associated with the vehicle 100. In an example, the vehicle dynamics module 102 imposes limitations relating to safety, e.g., to limit vehicle ride height selections to certain heights or modes, or prevent all height changes above a vehicle speed threshold, while a separate controller or module of the vehicle 100 is responsible for imposing limitations relating to vehicle ride modes, e.g., to limit ride height changes to be made in a manner consistent with a desired user experience in each of the modes.

Figure 17B:
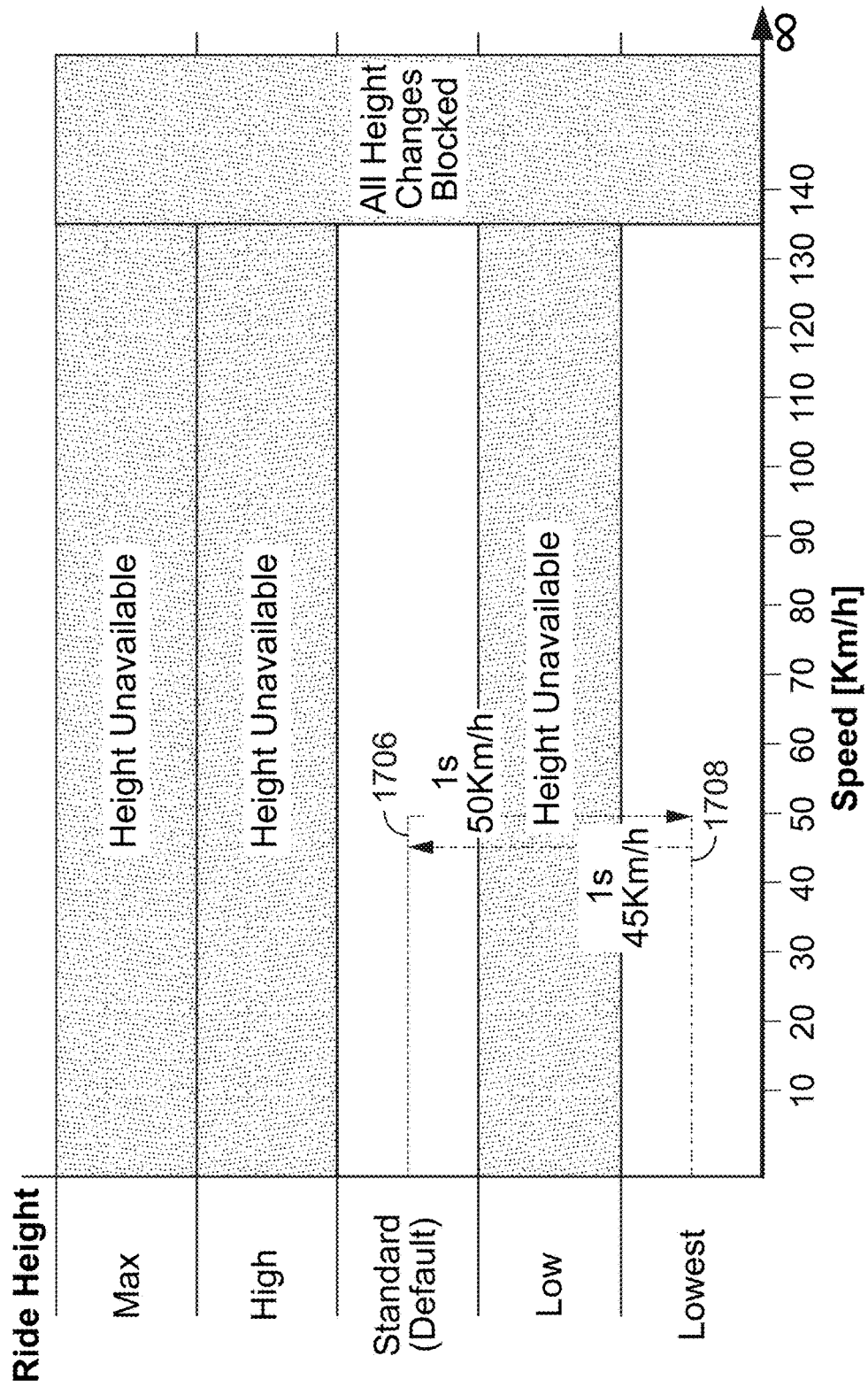
FIG. 17B shows a chart of ride height selections versus vehicle speed in a "conserve" ride height control mode, according to an example approach.

A second example mode illustrated in FIG. 17B is directed to a "conserve" mode, in which the vehicle 100 generally seeks to conserve power, e.g., when a traction battery of the vehicle has a relatively low state of charge. In the conserve mode, ride height selections may be restricted to the standard and lowest ride heights, e.g., as set forth in Table 1. The conserve mode may be convenient for reducing or minimizing consumption of electrical power by the vehicle 100. In the conserve mode of vehicle 100, ride height selections are limited between the lowest and standard ride heights. Further, automatic ride height adjustments may be implemented by vehicle 100 in response to changes in vehicle speed, as indicated by arrows 1706 and 1708. More specifically, when vehicle 100 is in the standard ride height setting, acceleration of the vehicle past 50 km/h and remaining above that speed for at least one (1) second will cause the vehicle 100 to lower ride height to the lowest ride height, as indicated by arrow 1706. As indicated by arrow 1708, upon decelerating to 45 km/h and remaining below that speed for at least one (1) second, vehicle 100 will automatically raise ride height back to the standard ride height. Height changes are also prevented above relatively higher speeds, e.g., above 135 km/h as illustrated in FIG. 17B. The conserve mode may generally seek to reduce power consumption by minimizing wind resistance at higher speeds, while reducing the number of raise/lower events through the reduced number of ride height settings.

Figure 17C:
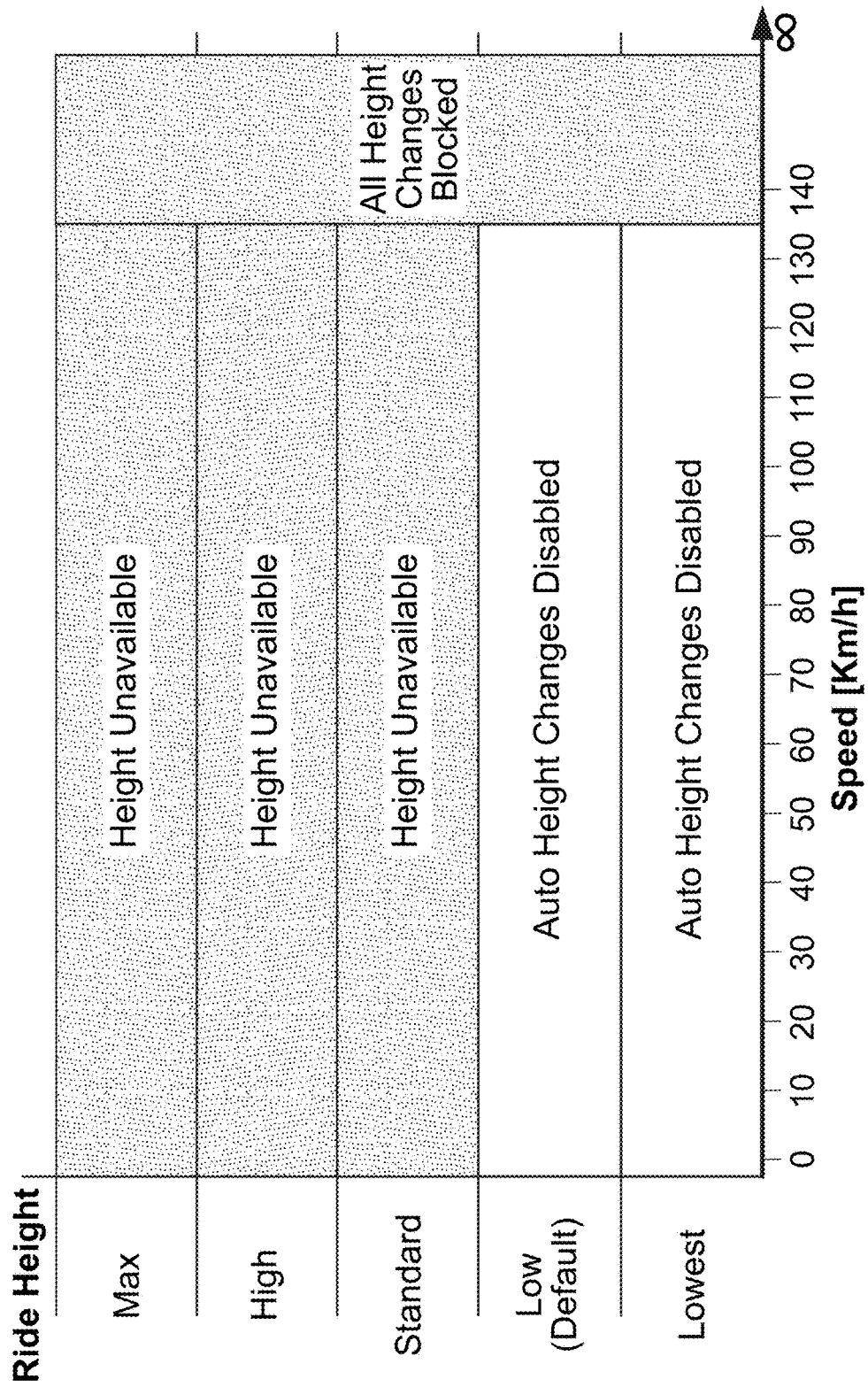
FIG. 17C shows a chart of ride height selections versus vehicle speed in a "sport" ride height control mode, according to an example approach.

A third example mode illustrated in FIG. 17C is directed to a "sport" mode, in which the vehicle may be relatively lowered, suspension components set to relatively stiffer settings, etc. Accordingly, ride height selections in the sport mode may be generally restricted to lower ride heights to reduce height of a center of gravity of the vehicle 100. For example, the sport mode as illustrated in FIG. 17C restricts ride heights of vehicle 100 to the low and lowest ride heights as set forth in Table 1. Further, automatic ride height adjustments are disabled (i.e., changes between the low/ lowest ride heights must be manually input or requested by the vehicle driver), and ride height adjustments are blocked entirely above 135 km/h.

Figure 17D:
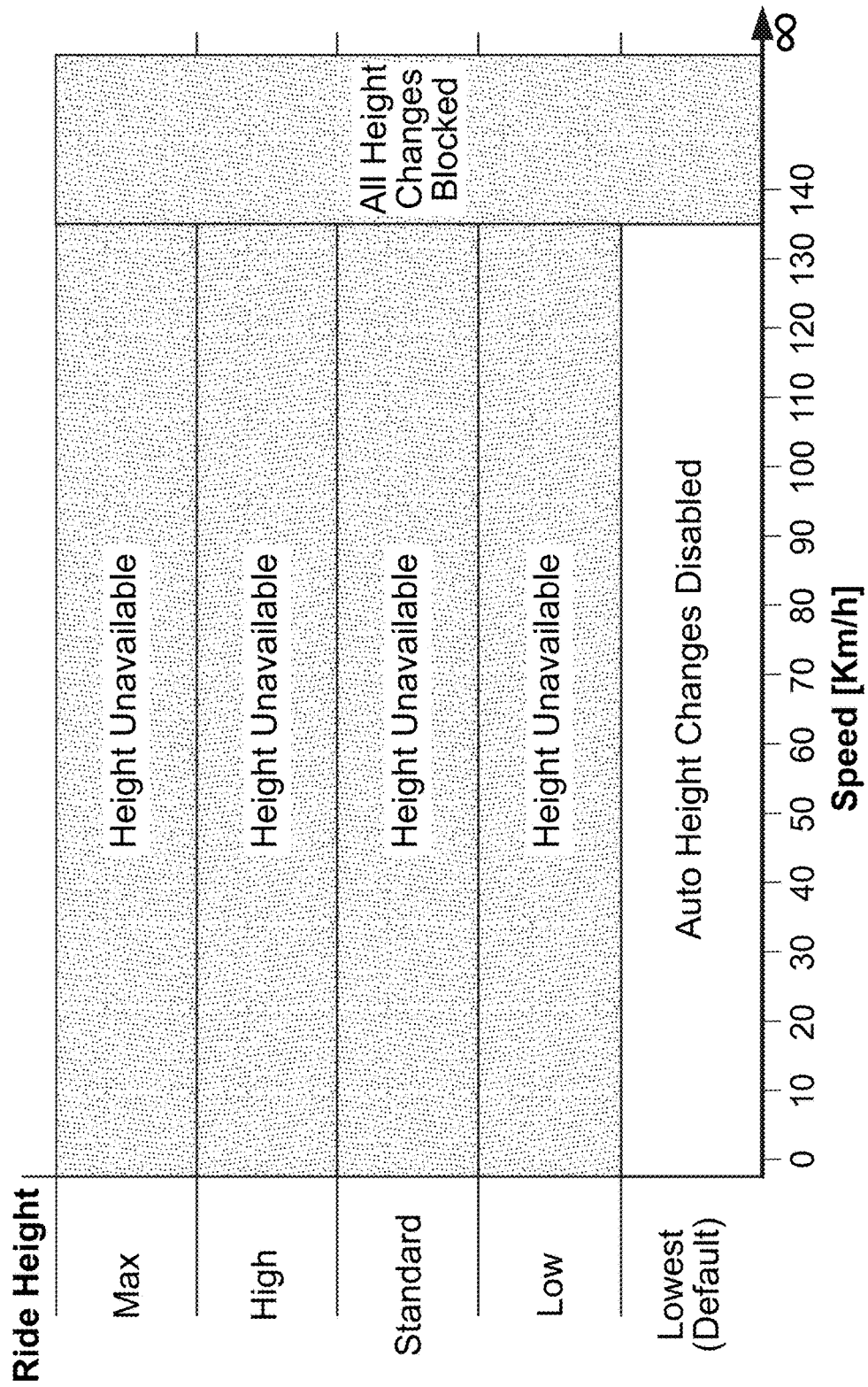
FIG. 17D shows a chart of ride height selections versus vehicle speed in a "sport launch" ride height control mode, according to an example approach.

Turning now to FIG. 17D, an example fourth mode is directed to a "sport launch" mode/sub-mode. More particularly, the "launch" sub-mode may be initiated in a menu of the user interfaces illustrated in FIGS. 3 and/or 4. In the launch sub-mode, vehicle settings such as ride height may be set to lowest/stiffest available settings to further reduce height of the vehicle's center of gravity, e.g., as may be useful for maximum acceleration from a standing stop. As illustrated in FIG. 17D, in the sport-launch mode the vehicle 100 remains in the lowest ride height setting, and all other ride heights are unavailable.

Figure 17E:
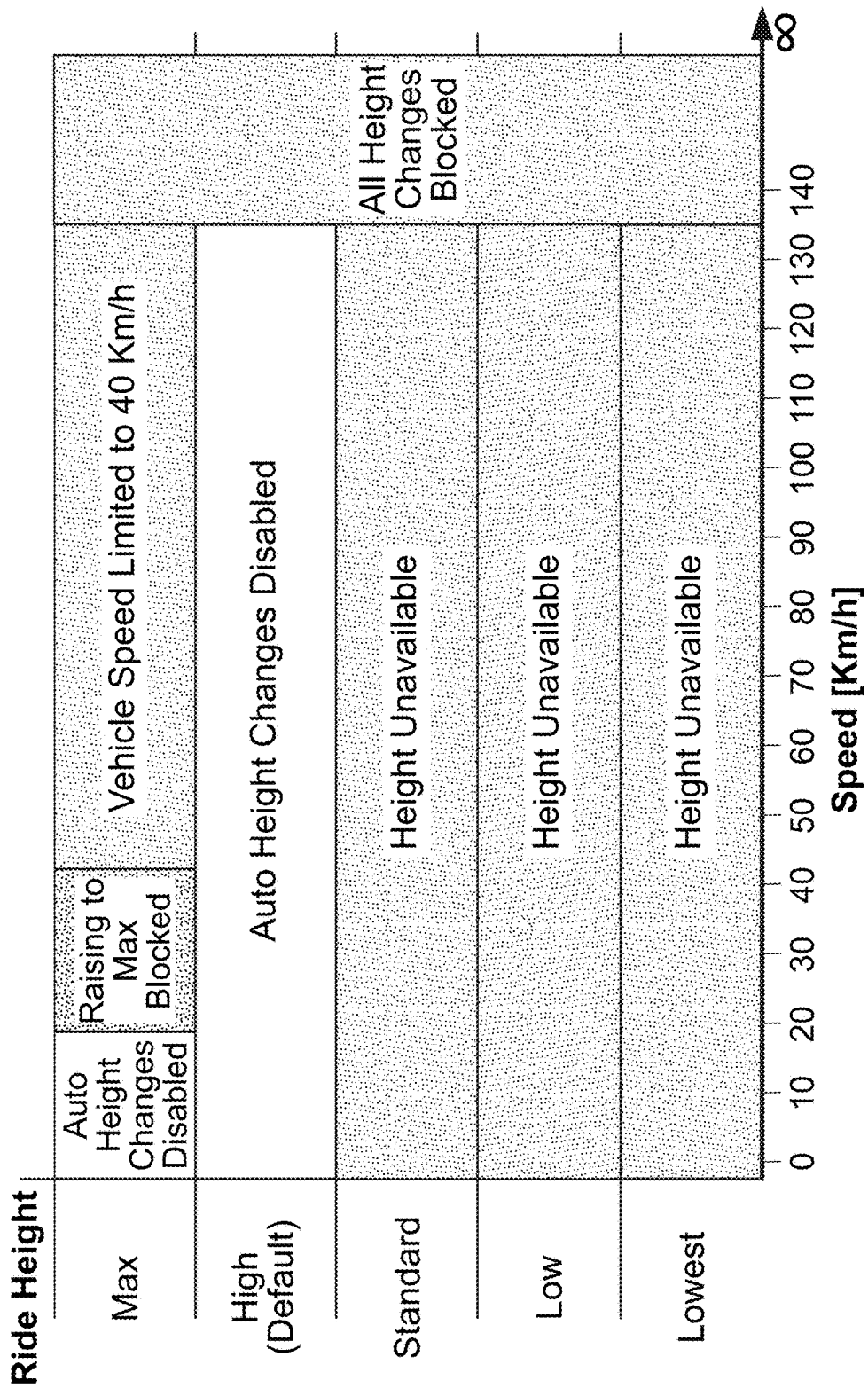
FIG. 17E shows a chart of ride height selections versus vehicle speed in an "off-road auto/rock crawl" ride height control mode, according to an example approach.

A fifth example mode illustrated in FIG. 17E is directed to an "off-road auto/rock crawl" mode, which may be convenient when vehicle 100 is traversing off-road or obstacles at relatively low speeds. For example, "auto" or "rock crawl" sub-modes may be selected with the vehicle 100 placed in the "off-road" mode, e.g., as described above in connections with FIGS. 3 and 4. Available ride heights are limited to the high and max ride heights. Automatic ride height settings are blocked. When the vehicle is in the max ride height, vehicle speed is limited to 40 km/h. Further requests from the driver to raise from the high ride height to the max ride height are blocked above 20 km/h. Additionally, ride height adjustments are blocked entirely above 135 km/h.

Figure 17F:
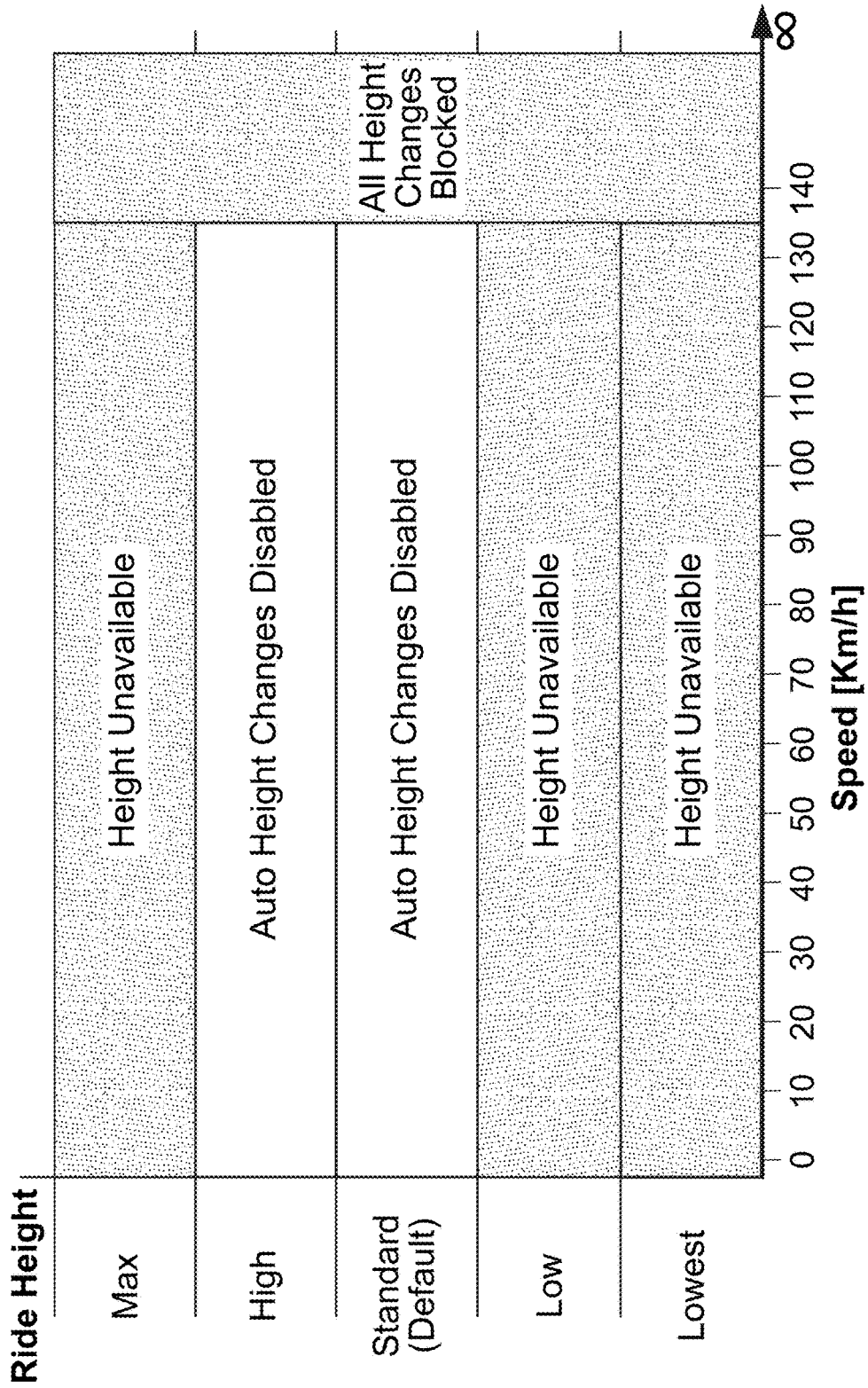
FIG. 17F shows a chart of ride height selections versus vehicle speed in an "off-road drift" ride height control mode, according to an example approach.

A sixth example mode illustrated in FIG. 17F is directed to "off-road drift" and "off-road rally" modes/sub-modes of the vehicle 100. For examples, "drift" and "rally" sub-modes may be selected with the vehicle in the "off-road" mode. In the off-road drift and off-road rally modes/sub-modes, ride height selections may be restricted to the standard and high ride heights, e.g., as set forth in Table 1. Further, automatic ride height adjustments are disabled, and ride height adjustments are blocked entirely above 135 km/h.

Figure 17G:
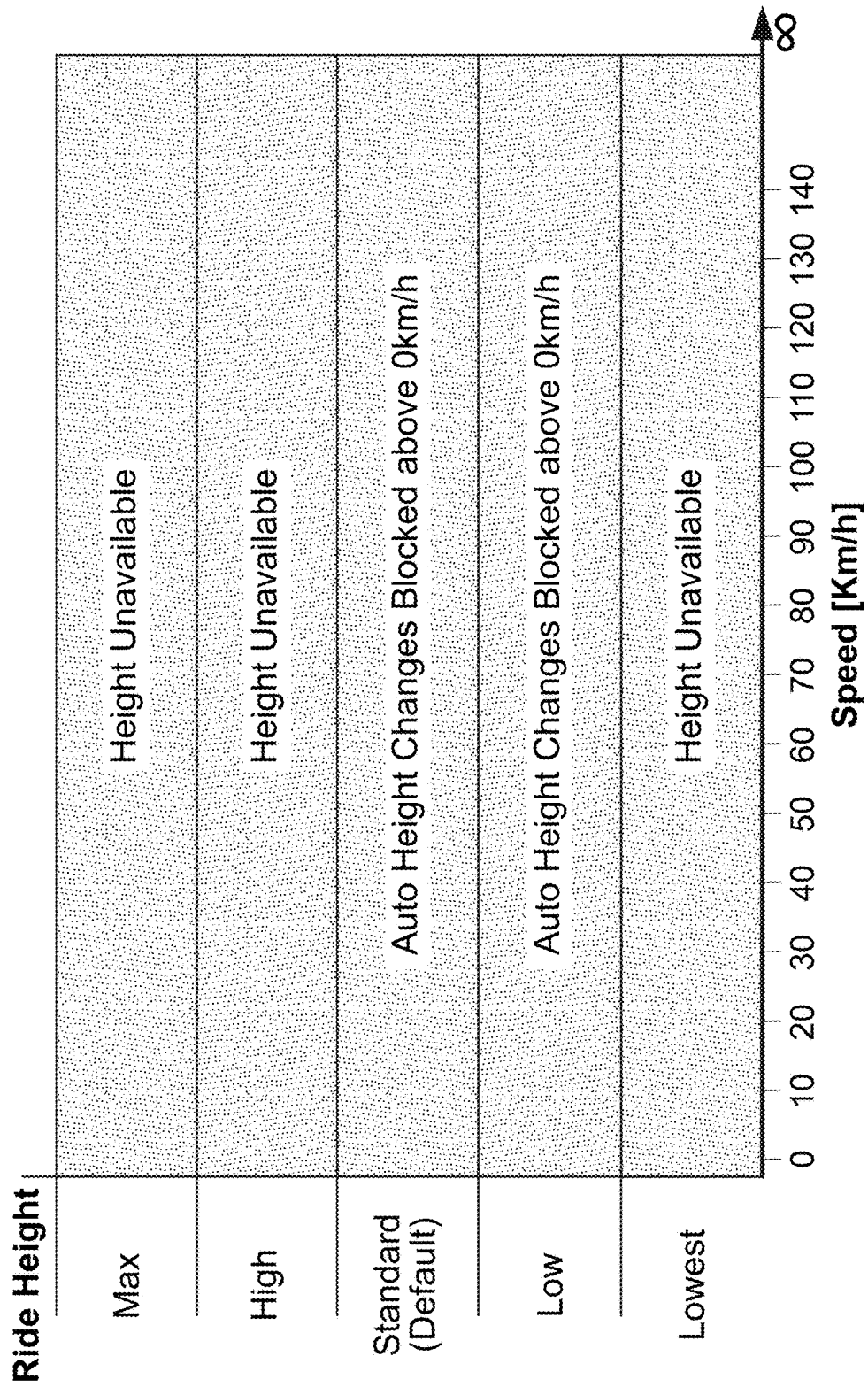
FIG. 17G shows a chart of ride height selections versus vehicle speed in an "trailer towing" ride height control mode, according to an example approach.

A seventh example mode illustrated in FIG. 17G is directed to a "trailer towing mode" of the vehicle 100. All ride height adjustments are disabled while the vehicle is moving (i.e., above 0 km/h), and manual ride height adjustments selections are limited to the standard and low ride heights.

Figure 18:
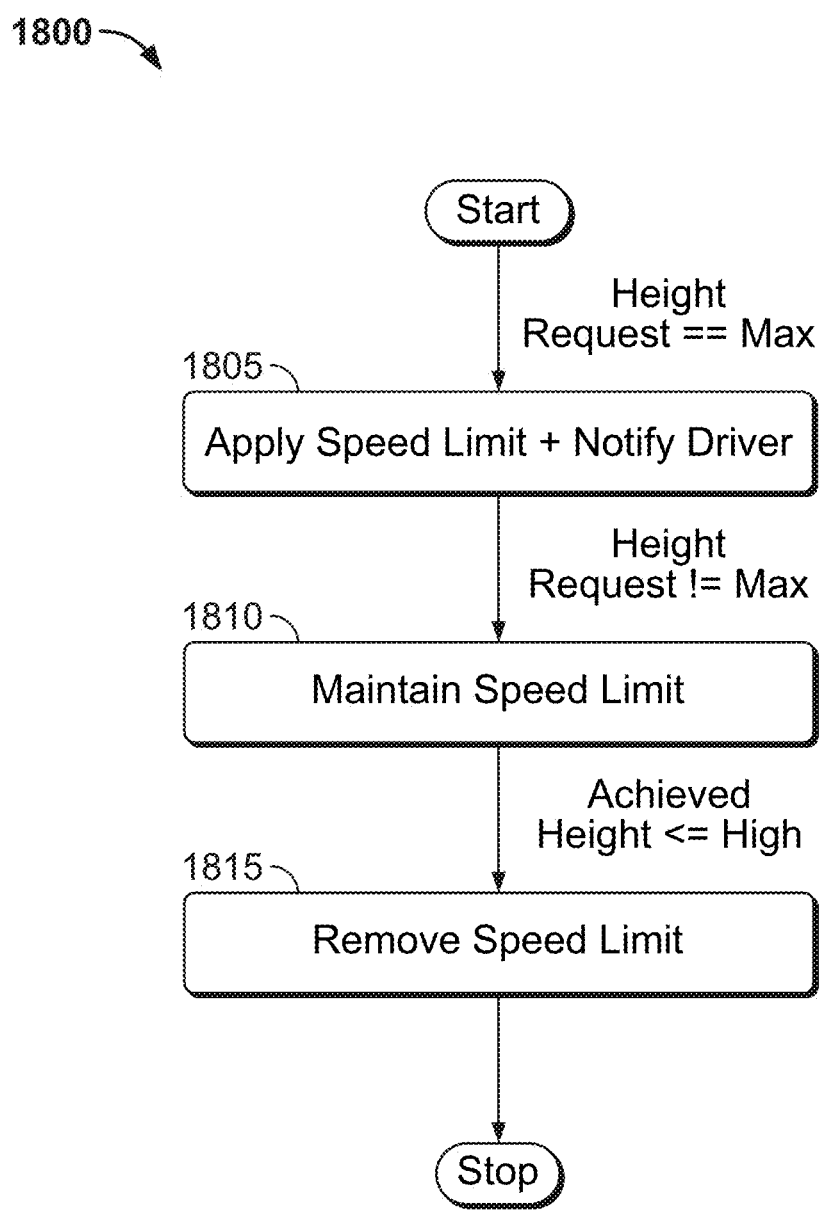
FIG. 18 shows a process flow diagram of a method of setting vehicle speed limits in response to suspension system height inputs, in accordance with an example illustration.

Referring now to FIG. 18, a process 1800 for setting vehicle speed limits in response to suspension system height inputs is illustrated and described in further detail. Process 1800 may begin at block 1805, where a vehicle speed limit is applied and communicated. For example, it may be desirable to limit speed of the vehicle 100 from attaining higher speeds when the vehicle is raised into a relatively high or maximum height of the vehicle relative to a ground surface, e.g., a ride height. In the example vehicle modes set forth in FIGS. 17A-17G implementing the ride heights of Table 1, the max ride height is available only in the off-road auto/rock crawl mode. Further, as described above in connection with FIG. 17E, vehicle speed may be limited to 40 km/h upon selection of the max ride height within the off-road auto/rock crawl mode. One or more of the ride heights may be above a predetermined vehicle height threshold applicable to the speed limit, such that when vehicle 100 is in a ride height that is above the limit, the speed limit(s) may be imposed and/or communicated to the operator/ driver. Other maximum speeds may be employed that are convenient and may be applicable to other ride/ground heights of the vehicle. As noted above, in some examples a speed limit imposed by the vehicle 100, e.g., in response to a ride height selection, may be communicated to the driver so that the driver has the opportunity to confirm or reconsider the height/mode request.

Proceeding to block 1810 of process 1800, the speed limit of the vehicle 100 may be initially maintained, e.g., in response to confirmation that the ride height selection causing the imposition of the speed limit, e.g., selection of the max ride height, has changed in response to the communication of the limit at block 1805 (e.g., the driver changes their mind. Initially, at block 1810, the speed limit is maintained until the vehicle 100 confirms that the achieved height is less than the height selection that caused the speed limit to be imposed. Accordingly, vehicle 100 may monitor ride height selections and maintain the speed limit as long as the max ride height is requested and until it is confirmed that the vehicle has not reached the max ride height. In response to a detection that the ride height achieved by the vehicle is less than the max ride height (e.g., in response to a driver input), the vehicle 100 may remove the speed limit imposed at block 1815.

Figure 19:
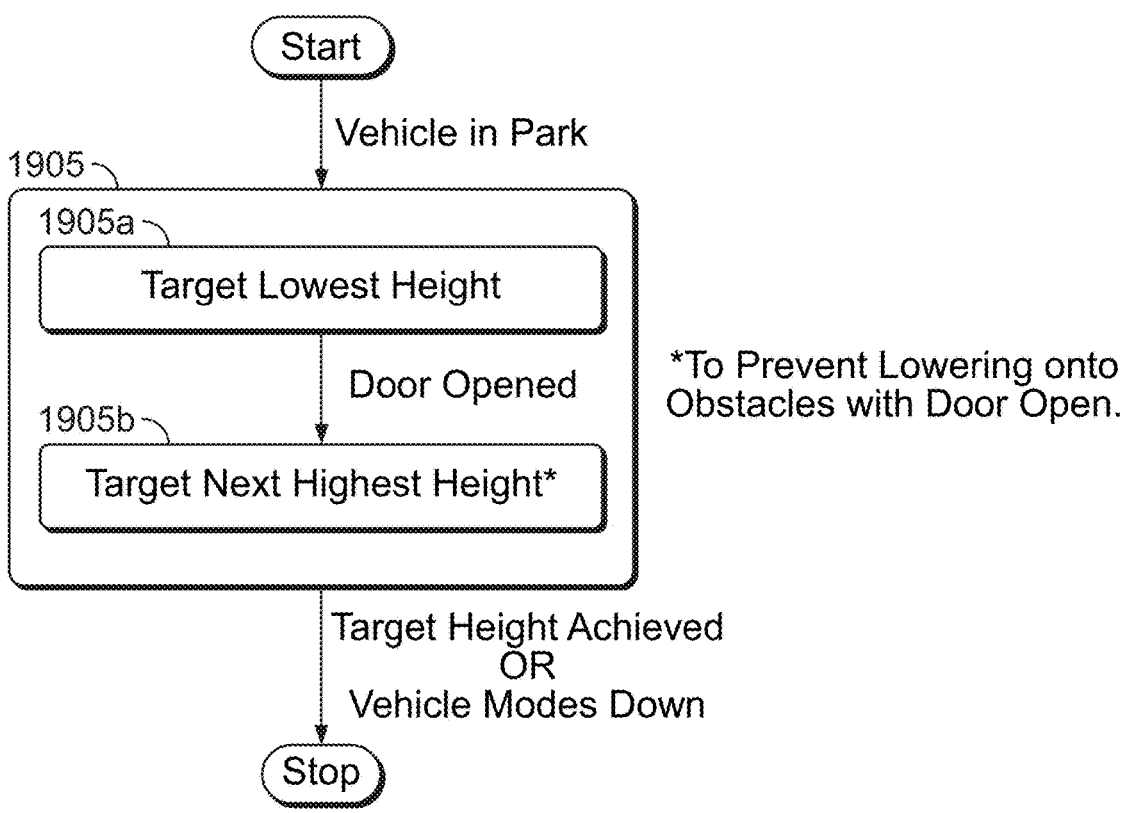
FIG. 19 shows a process flow diagram of a method of adjusting vehicle suspension heights to facilitate ease of entry to a vehicle, in accordance with an example illustration.
Figure 20:
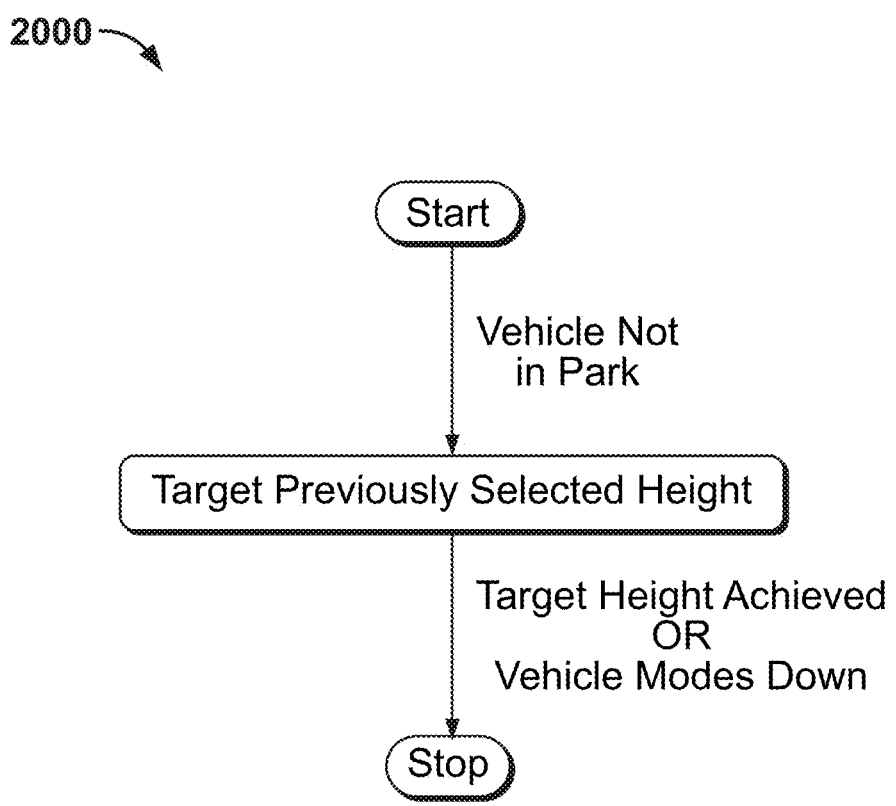
FIG. 20 shows a process flow diagram of a method of adjusting vehicle suspension heights in conjunction with the ease of entry mode illustrated in FIG. 19, in accordance with an example illustration.

Turning now to FIGS. 19 and 20, example processes for providing an "ease of entry" function in a vehicle, e.g., vehicle 100, are illustrated and described in further detail. Vehicle 100 may have an ease of entry feature or mode that may be disabled by default in vehicle 100, but which may be selected by a user/driver. Generally, the ease of entry function may facilitate a lowering of the vehicle to enhance ease of entry for occupants to the vehicle. One example process 1900 is illustrated in FIG. 19. Upon a detection that the vehicle 100 is in park, process 1900 proceeds to block 1905. Generally, at block 1905 process 1900 may change a ride height setting to a lowest available ride height. In the example illustrated, block 1905 comprises a first block 1905a and a second block 1905b. At block 1905a, a target lowest height is set for the vehicle 100. In an example, at block 1905a vehicle 100 may begin lowering to the target lowest height, e.g., the lowest ride height as set forth in Table 1. Proceeding to block 1905b, upon detection of a vehicle door being opened, process 1900 may raise the target height to the next highest ride height in real time. For example, if the vehicle is in between the "lowest" and "low" ride heights while lowering, the vehicle 100 may raise to the "low" ride height (rather than continuing to lower to the "low" height) when the determination is made that the door is open. Accordingly, to the extent the vehicle 100 has not reached the lowest ride height setting at the time the door is opened, process 1900 generally avoids the door contacting an obstacle (which might otherwise result if the vehicle 100 were to continue to lower as the door opened). Process 1900 may then terminate. Turning now to FIG. 20, another example process 2000 associated with an ease of entry feature for vehicle 100 is illustrated and described in further detail. Generally, in process 2000 a previously selected target height may be implemented in response to a determination that the vehicle 100 is not in Park or otherwise prepared for driving. Accordingly, the vehicle 100 may be raised to a desired ride height from a lowered position, e.g., into which the vehicle 100 was previously moved to facilitate egress from the vehicle 100. In the illustrated example, at block 2005 a previously selected height is targeted in response to the vehicle 100 being shifted from park. The vehicle 100 may continue being raised until the target ride height is reached, or it is otherwise no longer necessary to continue raising the vehicle 100 (e.g., the vehicle mode or selected ride height is lowered, the vehicle is powered down, etc.). Process 2000 may then terminate.

Figure 21:
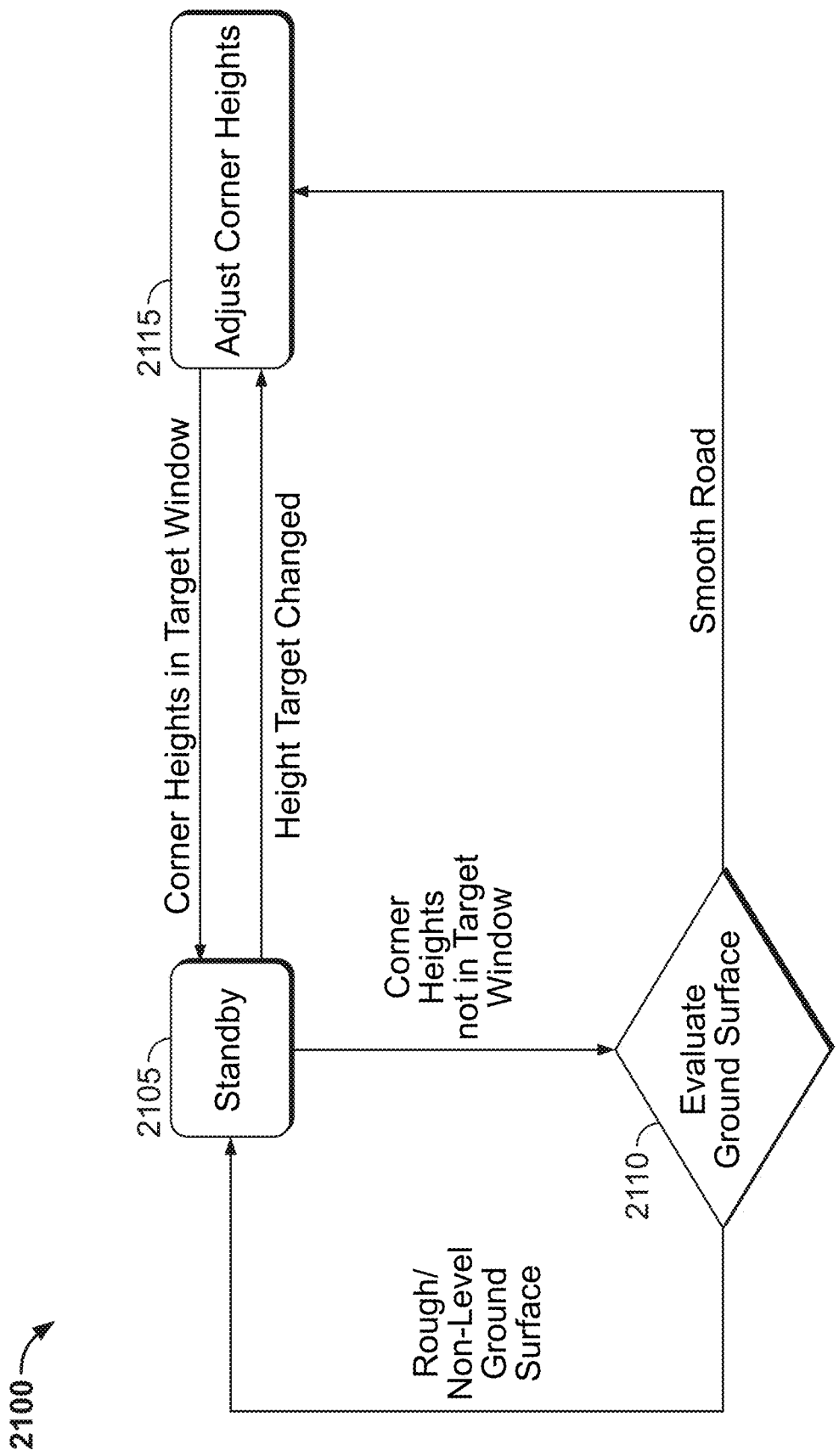
FIG. 21 shows a process flow diagram of a method of adjusting vehicle suspension heights to provide load levelling, in accordance with an example illustration.

Referring now to FIG. 21, an example process 2100 is illustrated and described in further detail which implements a load levelling behavior for vehicle 100. In the example process 2100, roughness may generally influence changes in ride height of the vehicle 100. More specifically, in the illustrated example an evaluation of a surface upon which the vehicle is traveling, e.g., a road surface, ground surface, trail, etc., may be used to determine whether/when to implement vehicle height changes.

Process 2100 may begin at block 2105, in which a standby condition may be used while vehicle 100 or components thereof monitor target corner heights of the vehicle 100. For example, while travelling along a given surface, process 2100 may monitor one or more corner heights of vehicle 100, e.g., to determine whether the corner height(s) are within an applicable range. When vehicle 100 detects that the corner height(s) are not within the target window, process 2100 may proceed to block 2110.

At block 2110, process 2100 may evaluate a ground surface, e.g., of a road, trail, or other surface being traversed by the vehicle 100. For example, process 2100 may determine a roughness, e.g., as described above in FIG. 5. Block 2110 may categorize the result as being above or below a threshold to determine whether the surface being traversed is "smooth" or "rough." Where it is determined at block 2110 that the roughness is "smooth," process 2100 may proceed to block 2115.

At block 2115, process 2100 may initiate an adjustment of the corner height(s) initially determined to be outside the applicable target window.

Alternatively, where it is determined at block 2110 that the roughness is rough, process 2100 may proceed to block 2105 to standby. In this manner, process 2100 may prevent vehicle 100 from attempting to level the vehicle while traversing relatively rough surfaces (or the vehicle is on a non-level surface, etc. as described above regarding FIG. 5).

It should be noted that process 2100 may proceed from block 2105 to block 2115 in response to a detection that a height target has changed, e.g., vehicle 100 has initiated an automatic change in ride height, or a driver/user of vehicle 100 has manually requested a ride height change. Process 2100 may therefore proceed to adjust corner height(s) of the vehicle 100. Upon confirmation that the corner height(s) of the vehicle are each within their applicable target window(s), process 2100 may proceed back to block 2105.

Figure 22:
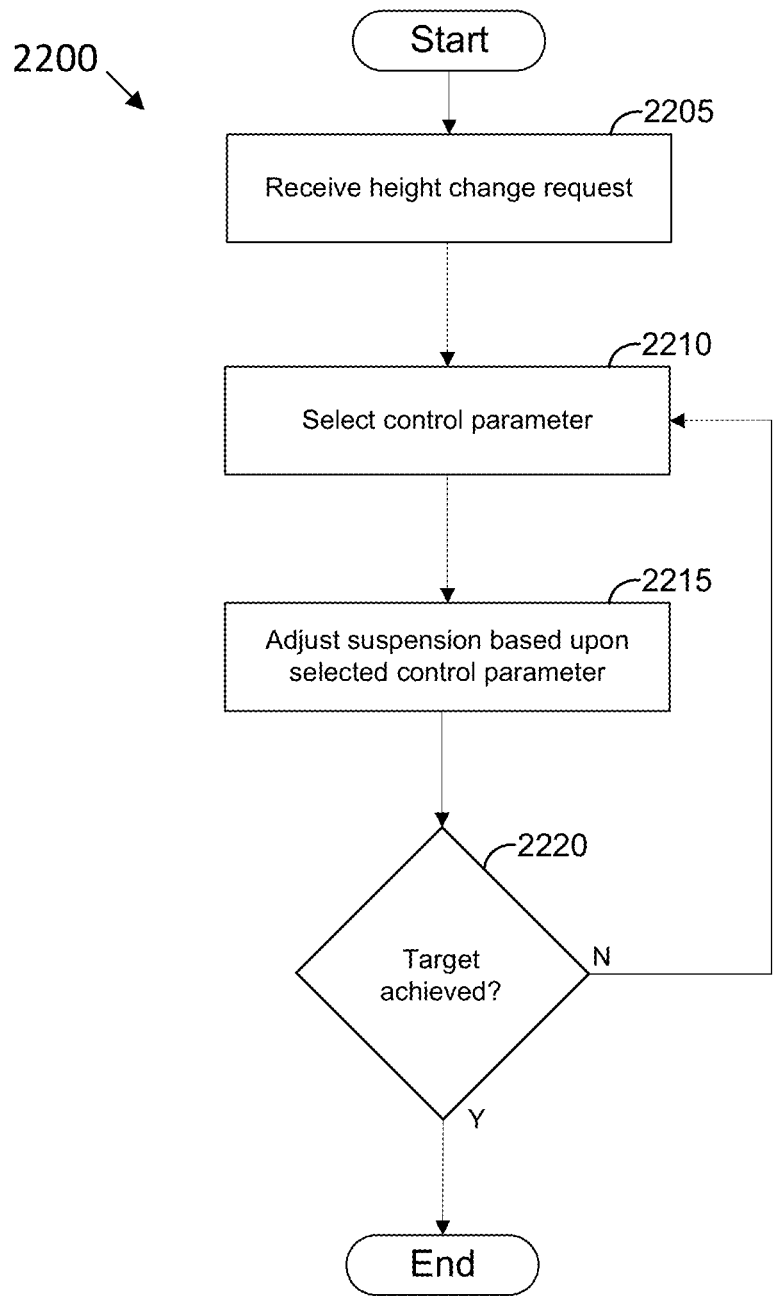
FIG. 22 shows a process flow diagram of a method of facilitating modifications of a suspension system of a vehicle, including selecting and/or changing a control parameter.

Turning now to FIG. 22, an example process 2200 for implementing height changes in a vehicle, e.g., vehicle 100, is illustrated and described in further detail. Generally, process 2200 may facilitate changes in ride height based upon different control parameters. The use of different control parameters may be particularly beneficial in the context of a vehicle with an air suspension system such as vehicle 100, however may also be used in the context of other suspension systems.

Generally, during nominal operating conditions the vehicle 100 and/or suspension system 101 may close a control loop around a target movement of the suspension, e.g., displacement of one or more of the air springs 104. At other times, however, control of ride height changes based on target movement or displacement may be difficult. For example, if vehicle 100 is positioned on an uneven surface, rocks, or the like such that one wheel is relatively unweighted or "hanging" off the ground, additions/subtractions of air to/from the air spring 104 of the unweighted wheel may not result in a detectable displacement of the air spring 104. Accordingly, the vehicle 100 may be unable to determine whether an appropriate adjustment to the air spring 104 has been made based upon displacement/position of the air spring 104, and controlling a ride height change at such time using displacement/position as a control parameter may be difficult.

In view of this shortcoming of displacement/movement-based control, the example process 2200 and/or vehicle 100 may control suspension adjustments based upon a different parameter at times when a displacement control criteria is not met, e.g., displacement control is not feasible or may be ineffective. In other words, a displacement control criteria may be defined to determine whether/when displacement/position may be used as a control parameter.

When process 2200 determines that displacement/position may not be effective under the displacement control criteria, the vehicle 100 may control additions/subtractions of air with respect to air springs 104 based upon a different control parameter than displacement or position. For example, process 2200 may use air mass instead of displacement as a control parameter. In this example, the vehicle 100 may determine, based upon a height change request, a target air mass of one or more (and in some examples all) of the air springs 104. The vehicle 100 may determine a target air mass based upon measurements of temperature of the air springs 104, reservoir, or other suspension component. The vehicle 100 may also determine a target air mass based upon a measured displacement of the air spring(s) 104. Based upon a known amount of air mass in the air spring 104, the vehicle 100 may then add/subtract an amount of air to/from the air spring 104 to achieve the target air mass of the air spring 104. As the air mass associated with air spring 104 may be more easily measured or detected than displacement/position when, for example, the wheel of the air spring 104 is unloaded or substantially so, a control loop based upon air mass may be more effective to implement a change in ride height change than one based on displacement/position. As a result, even during conditions when the adjustments to the air spring 104 may not result in a measurable movement of the air spring 104 displacement (e.g., due to the suspension of a wheel being fully extended or relatively unweighted), an appropriate adjustment may nevertheless be made to effect the change in ride height.

Process 2200 may begin at block 2205, where a height change request for a vehicle suspension is received. Process 2200 may then proceed to block 2210.

At block 2210, a height control method for implementing the height change may be selected in response to the height change request. In some examples, a plurality of height controls may be available. One example height control is displacement control, in which air is added to or removed from one or more air springs of the vehicle suspension based on a target displacement of the one or more air springs. Another example height control is an air mass control, in which air is added to or removed from the one or more air springs of the vehicle suspension based on a target air mass change of the one or more air springs.

As noted above, air mass control may be advantageous during certain conditions, such as when displacement control may be likely to be ineffective. In an example, vehicle 100 and/or process 2200 may select different controls, e.g., displacement control or air mass control, based upon conditions. More specifically, vehicle 100 may consider conditions that may indicate a likelihood of displacement control to be effective for implementing height change request. As noted above, displacement control may be likely to be ineffective when one or more wheels/air springs 104 are relatively unweighted, e.g., due to unevenness of a surface, rocks, etc. causing the wheel to be "hanging" from the vehicle.

The vehicle 100 and/or process 2200 may consider various factors that may indicate conditions where displacement control is likely to be ineffective or otherwise may present challenges. In at least some examples, the vehicle 100 may consider displacement of one or more of the springs of the vehicle 100 when selecting a control for implementing height changes. As will be elaborated further below, displacement may be used to determine whether a spring of the suspension, e.g., air spring 104, is unlikely to be able to control ride height changes using displacement/position of the spring as a control parameter. The displacement of the air spring 104 may be used to evaluate a displacement control criteria, and a control parameter/variable for implementing the ride height change may be selected based upon the displacement control criteria. In examples that follow, various displacement control criteria may be defined to evaluate conditions to determine whether displacement may be used as a control parameter for implementing a ride height change.

In one example, displacement of a spring, e.g., air spring 104, may be evaluated to determine whether a displacement control criteria is met enabling usage of displacement as a control parameter. Generally, when a wheel or air spring 104 of vehicle 100 is relatively unweighted a displacement of the relatively unweighted air spring 104 may be substantially different in comparison to at least one other of the air springs 104 of the vehicle 100. For example, vehicle 100 may be positioned on an uneven surface such that three wheels (and associated air springs 104) are supporting the weight of the vehicle 100, with the fourth wheel hanging in space such that air spring 104 is extended further in comparison to the other air springs 104, or even fully extended. In this case, the displacement of the air spring 104 of the hanging wheel will be substantially greater than that of the other three air springs 104. Similarly, a displacement of a single one of the air springs 104 may also indicate a relative displacement with respect to other air springs 104 of the vehicle, which may indicate that displacement control may not be feasible, and/or that air mass control would be beneficial. For example, if one of the air springs 104 is at a maximum displacement (i.e., wheel is fully extended from vehicle), this may generally indicate that other air springs 104 of the vehicle are not fully extended. In other words, to an extent that one wheel of the vehicle is fully extended or substantially so while the vehicle is stationary or at a relatively low speed, this can also indicate that the associated air spring 104 is relatively unweighted. As such, the other wheels/air springs 104 of the vehicle necessarily are carrying a larger proportion of vehicle weight, and are relatively less extended. Accordingly, in some examples a displacement control criteria indicative of selecting air mass control may be determined from a displacement of a single one of the wheels or air springs 104. For example, displacement of one or more of the air springs 104 may be compared with a displacement threshold (e.g., based upon a maximum or minimum displacement, or other appropriate threshold) to determine whether the displacement control criteria is met.

A displacement control criteria indicating that an air mass control may be beneficial may also be indicated by a level of twist of the vehicle. As noted above, twist may be defined as a difference between relative displacement differences of one axle of vehicle 100 in comparison to a different axle. If such a comparison of displacements of the air springs 104 indicates a level of twist above a twist threshold, this may also indicate relative unweighting of at least one wheel/air spring 104, and as such an air mass control for ride height changes may be beneficial.

In another example, a displacement control criteria indicating that air mass control may be beneficial may be determined from a load of one or more of the air springs 104. The air springs 104 may include a load cell to measure load of the air spring 104 directly. Alternatively, vehicle dynamics module 102 or other controller of the vehicle 100 may be configured to determine load based upon measured displacement of the air spring 104 and any other measurements, e.g., vehicle weight, pitch/roll, air mass, and/or temperature. In an example, if an air spring 104 is below a load threshold, e.g., a minimum load, or is unweighted, this would also indicate that the air spring 104 is fully extended or substantially so, and that other air springs 104/wheels of the vehicle 100 are carrying a relatively larger share of vehicle weight (and therefor are relatively less extended).

In a further example, a plurality of the foregoing factors, i.e., load, displacement, and twist, are considered together or in any subset that is convenient as part of a displacement control criteria.

It should also be noted that, to an extent displacement control is not feasible or may be ineffective, this may also indicate that an independent/individual control methodology with respect to the air springs 104 of the vehicle may also be beneficial, at least in comparison to an average axle height methodology. As noted above, during some operating conditions of vehicle 100, it may be desirable to control height/changes of the vehicle 100 based upon an average of measurements between both air springs 104 of the vehicle 100. However, as also noted above, where one wheel of an axle is relatively unweighted or relatively displaced compared to the other wheel of the same axle an individual or independent axle height control methodology (i.e., where control targets are implemented independently at each air spring 104 of a single axle of the vehicle 100). Accordingly, in at least some example approaches, a selection of air mass control at block 2210 also results in a selection of independent axle height control.

Process 2200 may then proceed to block 2215. At block 2215, an adjustment to one or more springs of vehicle 100 may be initiated based upon the control selected at block 2210. Where a displacement control is selected at block 2210, a target displacement or position of one or more of the air springs 104 of vehicle 100 may be set, and adjustments to the air springs 104 (e.g., by adding/subtracting air from the air spring(s) 104) may be made in an effort to achieve the target displacement.

On the other hand, where air mass control has been selected at block 2210, at block 2215 an air mass target may be set. A target air mass may be identified by vehicle 100, e.g., by vehicle dynamics module 102 based upon measurements associated with the suspension system 101. The vehicle dynamics module 102 may determine a target air mass change, i.e., a quantity of air to be added or subtracted from one or more air spring 104. The vehicle dynamics module 102 may also determine an action to implement the target air mass change based on one or more of a displacement of the air spring or a temperature of an air reservoir or a suspension component. Accordingly, the vehicle 100 may set a target air mass based upon, merely as examples, temperature (e.g., to an extent temperature affects expansion/contraction of air within the air spring 104) or position of suspension components (e.g., air spring 104).

After the adjustment of block 2215 is completed, process 2200 may proceed to block 2220. At block 2220, process 2200 may query whether the control target set at block 2215 has been achieved. In an example, the determined control target, e.g., a displacement target or air mass target, is compared with actual measurements. Where process 2200 determines that the target has been achieved, or is within a predetermined acceptable range, process 2200 may terminate. Alternatively, if the target has not been achieved, process 2200 may proceed back to block 2210, where process 2200 may again determine an appropriate control parameter and proceed to adjust components of the air suspension 101 of the vehicle 100. To an extent a first type of control parameter, e.g., displacement, is selected and determined to be ineffective, process 2200 may selects a different control parameter, e.g., air mass, in subsequent attempts.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Accordingly, the bounds of the claimed invention(s) should be determined from the claims and is not limited by the present disclosure. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A suspension system for a vehicle, comprising:
    a controller configured to:
        determine the vehicle is in a service environment; and
        set a height precision mode for the suspension system based on the determination the vehicle is in the service environment.

2. The suspension system of claim 1, wherein the height precision mode is selected from a plurality of height modes having different corresponding control tolerances, wherein the controller is further configured to identify an optimal one of the plurality of height modes based on the determination the vehicle is in the service environment, and to modify the suspension system to be in the determined height precision mode, and wherein the controller is further configured to disable an average axle control leveling of the vehicle based on the determination the vehicle is in the service environment.

3. The suspension system of claim 1, wherein the controller is further configured to determine the vehicle is outside of the service environment to set a height axle control mode, wherein the height axle control mode includes at least an average axle control methodology, wherein a height adjustment of the suspension system is based upon an average of two vehicle heights determined at a single axle of the vehicle.

4. The suspension system of claim 1, wherein the controller is further configured to determine the vehicle is outside of the service environment to set a height axle control mode, wherein the height axle control mode further includes an independent axle control methodology, wherein first and second height adjustments are independently implemented at a first wheel of an axle of the vehicle and a second wheel of the axle.

5. The suspension system of claim 4, wherein the controller is further configured to implement the independent axle control methodology in response to one of:
    detecting a height error; or
    detecting an incomplete height correction.

6. A suspension system for a vehicle, comprising:
    a controller configured to:
        detect a suspension operating condition of the vehicle; and
        based on the suspension operating condition, initiate a first height change at a first axle of the vehicle until an axle height difference limit is reached, initiate a second height change at a second axle of the vehicle until one of the axle height difference limit or an overall height change is reached, and then initiate a third height change at the first axle.

7. The suspension system of claim 6, wherein the suspension operating condition includes one of a ground surface angle, a vehicle steering angle, a vehicle speed, a suspension correction condition, or an ambient temperature.

8. The suspension system of claim 6, wherein the controller is further configured to change one of a height change limit, a vehicle speed limit associated with a ride height, a height change precision, an axle height adjustment independence level, a height adjustment threshold, or a suspension functionality level based on the suspension operating condition.

9. The suspension system of claim 6, wherein the suspension operating condition comprises a vehicle ground height, wherein the controller is further configured to change a vehicle speed limit based on the suspension operating condition, and wherein the controller is further configured to implement the vehicle speed limit in response to the vehicle ground height being above a predetermined vehicle height threshold.

10. The suspension system of claim 6, wherein the suspension operating condition comprises vehicle speed, wherein the controller is further configured to change a vehicle height limit based on the suspension operating condition, and wherein the controller is further configured to implement the vehicle height limit in response to the vehicle speed being above a predetermined vehicle speed threshold.

11. The suspension system of claim 6, wherein the suspension operating condition is one of an individual wheel articulation above a predetermined relative articulation threshold, an automatic levelling event, a drive mode change, or an operating environment of the vehicle, and wherein the controller is further configured to change an axle height control methodology based on the suspension operating condition.

12. The suspension system of claim 11, wherein the axle height control methodology includes at least an average axle control methodology, wherein a height adjustment of the suspension system is based upon an average of two vehicle heights determined at a single axle of the vehicle.

13. The suspension system of claim 12, wherein the axle height control methodology further includes an independent axle control methodology, wherein first and second height adjustments are independently implemented at a first wheel of an axle of the vehicle and a second wheel of the axle.

14. The suspension system of claim 13, wherein the controller is further configured to implement the independent axle control methodology in response to one of:
  detecting the operating environment of the vehicle is one of a manufacturing environment or a service environment;
  detecting a height error; or
  detecting an incomplete height correction.

15. The suspension system of claim 6, wherein the suspension operating condition includes an ambient temperature of the vehicle, wherein the controller is further configured to reduce a suspension activity in response to a first temperature detected above a predetermined threshold.

16. The suspension system of claim 6, wherein the controller is further configured to change a suspension activity between a plurality of discrete suspension activity categories, each of the discrete suspension activity categories including one or more suspension operating parameter adjustments.

17. The suspension system of claim 6, wherein the controller is further configured to equalize an air pressure of a plurality of air springs of a single axle after implementing a height change at the single axle, the plurality of air springs associated with opposite wheels of the single axle.

18. The suspension system of claim 6, wherein the controller is further configured to change one or more heights of the vehicle by changing an amount of air contained by one or more air springs of the vehicle.

19. A method, comprising:
  detecting, using a controller, a suspension operating condition of a suspension system of a vehicle; and
  based on the suspension operating condition, initiating, using the controller, a first height change at a first axle of the vehicle until an axle height difference limit is reached, initiating a second height change at a second axle of the vehicle until one of the axle height difference limit or an overall height change is reached, and then initiating a third height change at the first axle.

20. The suspension system of claim 6, wherein the controller is further configured to change to an average axle control methodology associated with the suspension system based on the suspension operating condition, wherein the average axle control methodology comprises determining a height adjustment of the suspension system based upon an average of two vehicle heights determined at a single axle of the vehicle.

* * * * *